(12) United States Patent
Torigoe et al.

(10) Patent No.: US 8,495,164 B2
(45) Date of Patent: Jul. 23, 2013

(54) DATA TRANSFER DEVICE AND DATA TRANSFER METHOD

(75) Inventors: Osamu Torigoe, Fujisawa (JP); Yusuke Yauchi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 412 days.

(21) Appl. No.: 12/919,176

(22) PCT Filed: Jun. 7, 2010

(86) PCT No.: PCT/JP2010/003774
§ 371 (c)(1),
(2), (4) Date: Aug. 24, 2010

(87) PCT Pub. No.: WO2011/154986
PCT Pub. Date: Dec. 15, 2011

(65) Prior Publication Data
US 2012/0185554 A1     Jul. 19, 2012

(51) Int. Cl.
*G06F 15/167* (2006.01)
(52) U.S. Cl.
USPC ........... 709/212; 709/201; 709/217; 709/218; 709/220; 709/223
(58) Field of Classification Search
USPC .................. 709/201, 212, 217, 218, 220, 223
See application file for complete search history.

(56) References Cited

U.S. PATENT DOCUMENTS

| | | | | |
|---|---|---|---|---|
| 5,713,044 A | * | 1/1998 | Gillespie et al. | 710/22 |
| 6,167,475 A | * | 12/2000 | Carr | 710/113 |
| 7,120,708 B2 | * | 10/2006 | Futral et al. | 710/26 |
| 7,660,916 B2 | * | 2/2010 | Moskalev et al. | 710/22 |
| 2005/0050244 A1 | | 3/2005 | Oda et al. | |
| 2006/0023625 A1 | * | 2/2006 | Ikawa | 370/216 |
| 2006/0288128 A1 | * | 12/2006 | Moskalev et al. | 710/22 |
| 2007/0198798 A1 | | 8/2007 | Kanai et al. | |
| 2010/0124196 A1 | * | 5/2010 | Bonar et al. | 370/329 |
| 2011/0047218 A1 | * | 2/2011 | Nojima et al. | 709/205 |
| 2011/0296129 A1 | * | 12/2011 | Arai et al. | 711/165 |

FOREIGN PATENT DOCUMENTS

| | | |
|---|---|---|
| JP | 08-077099 | 3/1996 |
| JP | 09-062610 | 3/1997 |
| JP | 2005-078596 | 3/2005 |
| WO | WO 2007/090269 A1 | 8/2007 |

OTHER PUBLICATIONS

PCT International Search Report and Written Opinion on application No. PCT/JP2010/003774 dated Mar. 14, 2011; 11 pages.

* cited by examiner

*Primary Examiner* — Liangche A Wang
(74) *Attorney, Agent, or Firm* — Foley & Lardner LLP

(57) ABSTRACT

An object of the present invention is to efficiently perform a data transfer by using a plurality of data transfer devices. A storage apparatus 10 includes: a channel control unit 11 having a first DMA 1142, a second DMA 1112, and a memory 113; a processor unit 12; and a drive control unit 13 that communicates with a storage device 17. When the channel control unit 11 transfers to a host computer 3 data stored in a cache memory 14, the first DMA 1142 receives from a processor unit 12 a setting of a first transfer parameter 151 for the first DMA 1142 containing a second transfer parameter 152 for the second DMA 1112, performs a first data transfer from the cache memory 14 to the memory 113 according to the first transfer parameter 151, and sets the second transfer parameter in the second DMA 1112 thereby to cause the second DMA 1112 to perform a data transfer from the memory 113 to the host computer 3.

15 Claims, 18 Drawing Sheets

Fig. 12

DATA WRITE REQUEST 1200

| 1211 | 1212 | 1213 | 1214 | 1215 | |
|---|---|---|---|---|---|
| I/O COMMAND | LUN | ADDRESS | TRANSMISSION SOURCE PORT ID | WRITE DATA | ... |

DATA READ REQUEST 1250

| 1251 | 1252 | 1253 | 1254 | 1255 | |
|---|---|---|---|---|---|
| I/O COMMAND | LUN | ADDRESS | TRANSMISSION SOURCE PORT ID | DATA SIZE | ... |

EXAMPLE OF FIRST DMA TRANSFER PARAMETER 151
OR SECOND DMA TRANSFER PARAMETER 152

EXAMPLE OF FIRST COMPLETION STATUS
OR SECOND COMPLETION STATUS

DATA TRANSFER DEVICE AND DATA TRANSFER METHOD

TECHNICAL FIELD

The present invention relates to a data transfer device and a data transfer method, particularly to a technique for efficiently performing a data transfer by use of a plurality of data transfer devices.

BACKGROUND ART

In relation to data transfer devices such as DMA (Direct Memory Access), various techniques have been proposed to improve data transfer efficiency. For example, Patent Literature (PTL) 1 describes a DMA controller which alternately controls a first count control unit that controls a transfer parameter for a first DMA transfer channel and a second count control unit that controls a transfer parameter for a second DMA transfer channel. While a data transfer of a plurality of data blocks is in progress, the second count control unit loads from the memory a transfer parameter for the data block to be transferred subsequently, during an idle cycle in a data transfer by the first count control unit. In this way, PTL 1 intends to eliminate the need for control by a CPU and to cancel a delay between a completion time of a data block transfer and an activation time of the subsequent data block transfer.

In addition, PTL 2 aims to reduce load on a CPU, and discloses that the need for interruption to a CPU, which may otherwise occur for each DMA transfer, is eliminated in such a manner that address information of a transfer parameter of a DMA in the main storage device is stored in an address register, and that a transfer parameter is read according to the address information stored in the address register, and is registered in a parameter register.

PTL 3 describes a device provided with a first processor and a second processor and designed to achieve efficient use of the first processor and the second processor. In the device, the first processor writes into a memory data transfer information including information indicating a storage location in a first storage area and information indicating a storage location in a second storage area, and then the second processor reads the data transfer information from the memory, and transfers to the second storage area the data stored in the first storage area, according to the data transfer information. In this manner, the first processor is enabled to start execution of subsequent processing without waiting for a notification from the second processor.

CITATION LIST

Patent Literature

PTL 1: Japanese Patent Application Laid-open Publication No. Hei 09-62610
PTL 2: Japanese Patent Application Laid-open Publication No. Hei 08-77099
PTL 3: Japanese Patent Application Laid-open Publication No. 2005-78596

SUMMARY OF INVENTION

Technical Problem

FIG. 22 is an example of a hardware configuration of a storage apparatus 10 which serves as a data storage for a host computer 3 which is communicatively coupled to the storage apparatus 10. As shown in FIG. 22, the storage apparatus 10 includes a channel control unit 11, a processor unit 12, a cache memory 14, and an internal switch 16 which couples these components so as to allow them to communicate with each other.

The channel control unit 11 includes an external network I/F 111 that communicates with the host computer 3, an internal network I/F 114 that communicates with the processor unit 12 and the cache memory 14 via the internal switch 16, and a memory 113 which serves as a buffer for a data transfer between the external network I/F 111 and the internal network I/F 114. The external network I/F 111 includes a second DMA 1112, and the internal network I/F 114 includes a first DMA 1142.

FIG. 23 is a diagram explaining operations related to a data transfer performed in the storage apparatus 10, and more specifically, a flowchart illustrating the operations performed when the channel control unit 11 reads data stored in the cache memory 14 and transmits the read data to the host computer 3.

As shown in FIGS. 22 and 23, for the purpose of a data transfer, the processor unit 12 first sets a transfer parameter in the first DMA 1142 (S2211, S2311). The first DMA 1142 then starts a data transfer (starts a transfer of the data stored in the cache memory 14 to the memory 113) according to the transfer parameter thus set (S2212, S2312).

While the data transfer is in progress, the internal network I/F 114 monitors whether the data transfer by the first DMA 1142 is completed or not (S2313). When the data transfer is completed (S2313: YES), the internal network I/F 114 notifies the processor unit 12 of the completion status (S2213, S2314).

When being notified of the completion status from the internal network I/F 114, the processor unit 12 sets a transfer parameter in the second DMA 1112 (S2214, S2315). Thereby, the second DMA 1112 starts a data transfer (a transfer of the data stored in the memory 113 to the host computer 3) according to the transfer parameter (S2215, S2316).

While the data transfer is in progress, the external network I/F 111 monitors whether the data transfer by the second DMA 1112 is completed or not (S2317). When the data transfer is completed (S2317: YES), the external network I/F 111 notifies the processor unit 12 of the completion status (S2216, S2318).

In the above-mentioned processing, the processor unit 12 sets transfer parameters in both of the first DMA 1142 and the second DMA 1112 by communicating with both of them via the internal switch 16. Such communications with both of the first DMA 1142 and the second DMA 1112 via the internal switch 16 cause a delay in processing of an entire data transfer, thus leading to an adverse effect on performances (for example, throughput, or response performance to the host computer 3) of the storage apparatus 10. Furthermore, the processor unit 12 activates the second DMA 1112 only after receiving a notification of a completion status from the first DMA 1142. This notification is made also via the internal switch 16, and therefore causes a delay and an adverse effect on the performances of the storage apparatus 10.

Nowadays, the structure of the storage apparatus 10 has become more complicated due to its upsizing and higher redundancy, and the entity which activates a data transfer (the processing unit 12) and the other entity which is activated (the first DMA 1142, the second DMA 1112) have an increasingly longer communication distance between them. Thus, an adverse effect that the delay due to the above-mentioned reasons places on the performances of the storage apparatus 10 is not always negligible any more.

The present invention is made in view of such background, and it is an object of the invention to provide a data transfer device and a data transfer method that can efficiently perform a data transfer by use of a plurality of data transfer devices.

Solution to Problem

One aspect of the present invention to achieve the above-mentioned object is a data transfer device functioning as a first data transfer device in a data transfer control device including
the first data transfer device which is communicatively coupled to a transfer source device and a memory, receives a setting of a first transfer parameter made by another device, and performs a first data transfer from the transfer source device to the memory according to the first transfer parameter thus received, and
a second data transfer device which is communicatively coupled to a transfer destination device, the memory, and the first data transfer device, receives a setting of a second transfer parameter made by the other device, and performs a second data transfer from the memory to the transfer destination device according to the second transfer parameter thus received, wherein
the data transfer device receives from the other device the first transfer parameter containing the second transfer parameter, performs the first data transfer according to the received first transfer parameter, and sets the second data transfer device to have the second transfer parameter contained in the first transfer parameter.

Other problems and their solutions disclosed by the present application will become apparent by the description in Description of Embodiments and the drawings.

Advantageous Effects of Invention

According to the present invention, it is possible to efficiently perform a data transfer by use of a plurality of data transfer devices.

BRIEF DESCRIPTION OF DRAWINGS

FIG. 12 is examples of data formats for a data write request 1200 and a data read request 1250.

DESCRIPTION OF EMBODIMENTS

In the following, the embodiments are described in conjunction with the drawings.

First Embodiment

Figure 1:
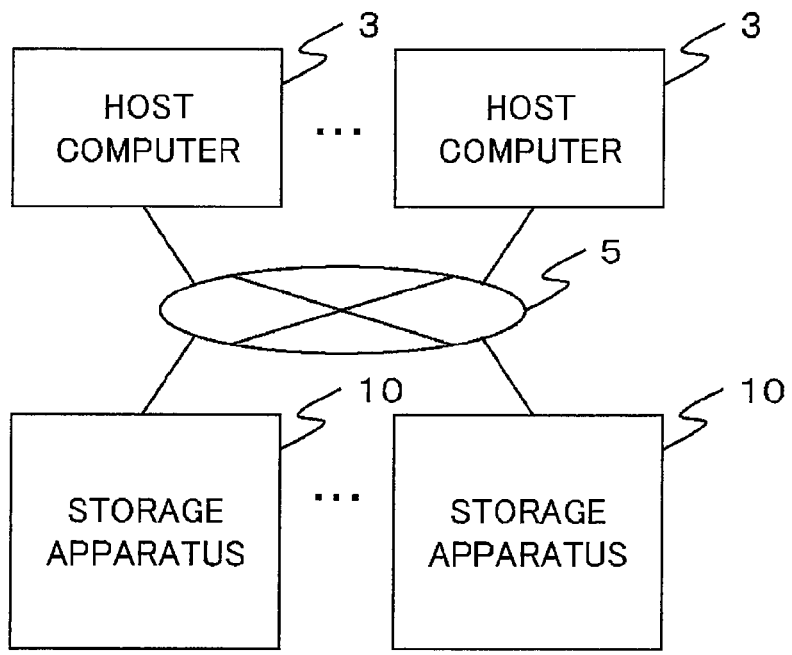
FIG. 1 is a diagram showing a schematic configuration of an information processing system 1.

FIG. 1 shows a schematic configuration of an information processing system 1 described as a first embodiment. As shown in FIG. 1, the information processing system 1 is configured by including at least one host computer 3 (external device), and at least one storage apparatus 10.

The host computer 3 is, for example, a computer which provides a service such as automated teller service of a bank, or Web page browsing service on the Internet. The storage apparatus 10 provides a data storage area to an application program executed in the host computer 3, or the like.

The host computer 3 and the storage apparatus 10 are communicatively coupled to each other via a storage network 5. The storage network 5 is, for example, a LAN (Local Area Network), WAN (Wide Area Network), SAN (Storage Area Network), the Internet, a public line, a private line, and the like. Communication via the storage network 5 is performed in accordance with a protocol, such as TCP/IP, iSCSI (internet Small Computer System Interface), the Fibre Channel Protocol, FICON (Fibre Connection) (registered trademark), ESCON (Enterprise System Connection) (registered trademark), ACONARC (Advanced Connection Architecture) (registered trademark), and FIBARC (Fibre Connection Architecture) (registered trademark), for example.

The hardware of the host computer 3 is, for example, a personal computer, a Mainframe, an office computer, and the like. The host computer 3 transmits to the storage apparatus 10 a data frame (hereinafter abbreviated as a frame) including a data I/O request (such as a data write request, or a data read request) when accessing the above-mentioned storage area provided by the storage apparatus 10. The frame is, for example, Fibre Channel frame (FC frame).

Figure 2:
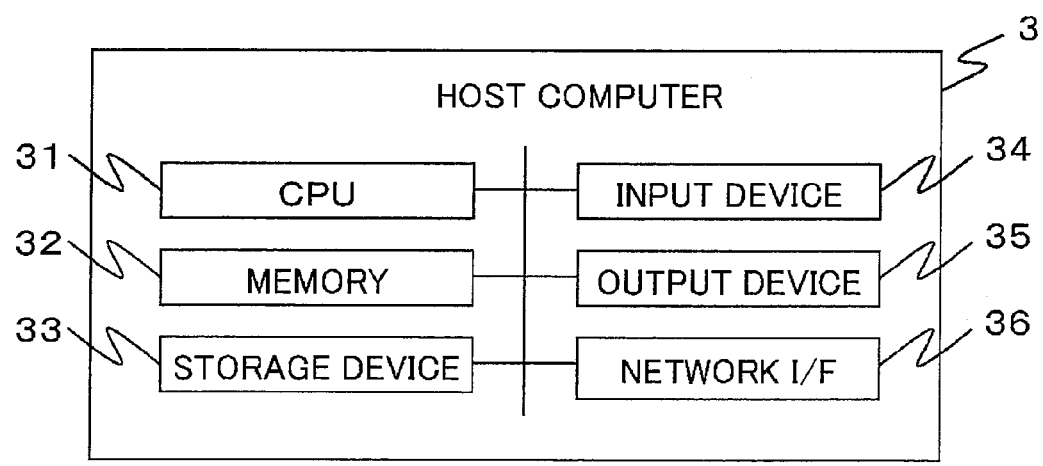
FIG. 2 is a diagram showing a hardware configuration of a host computer 3.

FIG. 2 shows an example of hardware of an information processing device (computer) which can be utilized as a host computer 3. As shown in FIG. 2, the information processing device includes a CPU 31, a volatile or non-volatile memory 32 (RAM or ROM), a storage device 33 (for example, an HDD (Hard Disk Drive) or a semiconductor storage device (or, SSD (Solid State Drive))), an input device 34 such as a keyboard or a mouse, an output device 35 such as a liquid crystal monitor or a printer, and a network interface (hereinafter referred to as a network I/F 36) such as an NIC (Network Interface Card) or an HBA (Host Bus Adapter).

Figure 3:
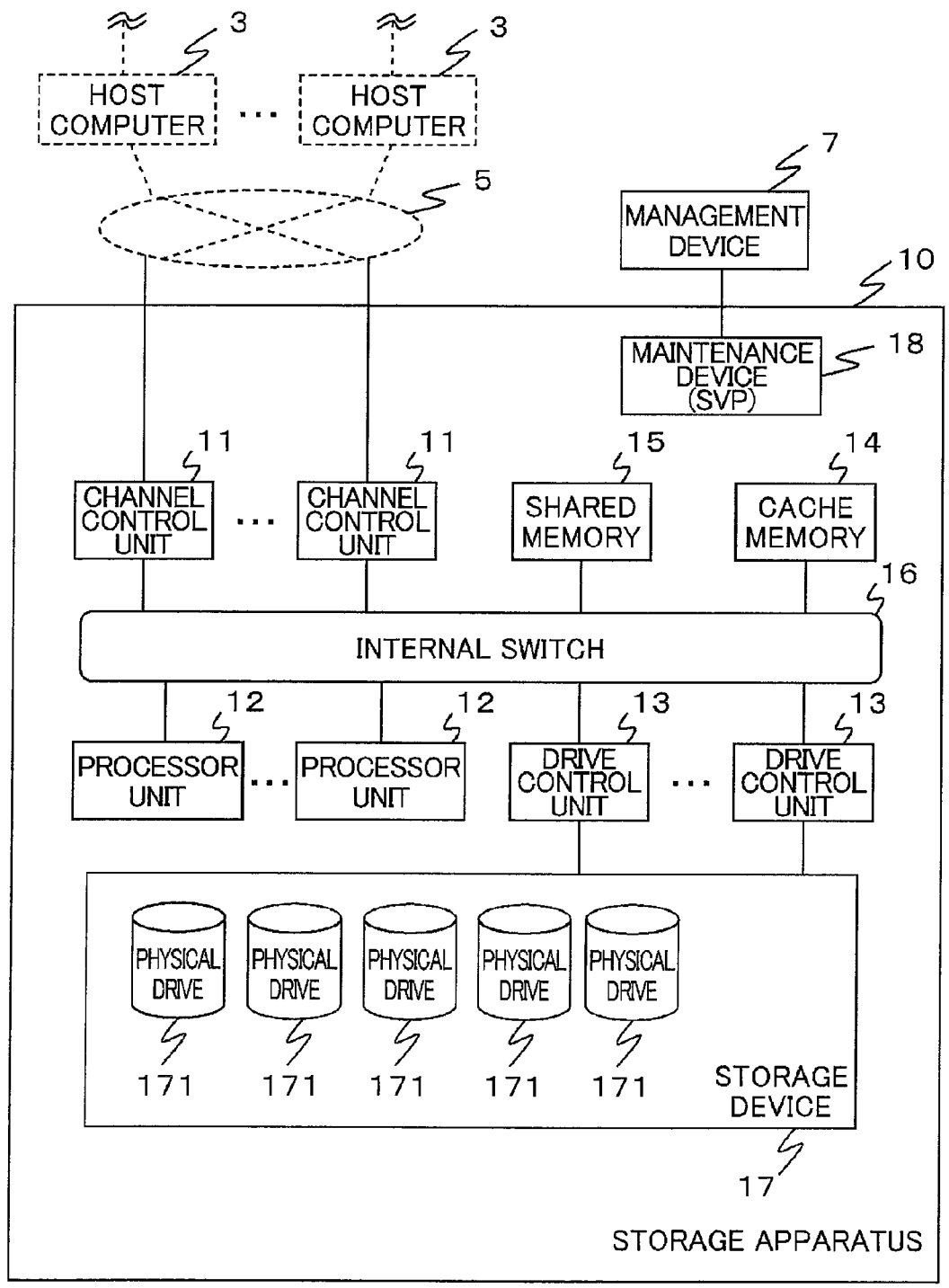
FIG. 3 is a diagram showing a hardware configuration of a storage apparatus 10.

FIG. 3 shows an example of a hardware configuration of the storage apparatus 10. The storage apparatus 10 is, for example, a disk array device. As shown in FIG. 3, the storage apparatus 10 includes at least one channel control unit 11, at least one processor unit 12 (Micro Processors), at least one drive control unit 13, a cache memory 14, a shared memory 15, an internal switch 16, a storage device 17, and a maintenance device 18 (SVP: SerVice Processor). The channel control unit 11, the processor unit 12, the drive control unit 13, the cache memory 14, and the shared memory 15 are communicatively coupled to each other via the internal switch 16.

Among these components, the channel control unit 11 receives a frame transmitted from the host computer 3, and transmits to the host computer 3 a frame including a response to processing requested by a data I/O request included in the received frame (for example, read data, a read completion report, or a write completion report).

In response to the above-mentioned data I/O request included in the frame received by the channel control unit 11, the processor unit 12 performs processing related to a data transfer made between the channel control unit 11, the drive control unit 13, and the cache memory 14. The processor unit 12 passes data (data read from the storage device 17 and data to be written into the storage device 17) between the channel control unit 11 and the drive control unit 13 via the cache memory 14, performs staging (reading data from the storage device 17) or destaging (writing data of the cache memory 14 to the storage device 17) of data stored in the cache memory 14, and performs other processing.

The cache memory 14 is configured with, for example, a RAM (Random Access Memory) capable of high-speed access. The cache memory 14 stores therein data to be written into the storage device 17 (hereinafter referred to as write data), data read from the storage device 17 (hereinafter referred to as read data), and the like.

The shared memory 15 stores therein various types of information used for controlling the storage apparatus 10.

The drive control unit 13 communicates with the storage device 17 at the time of reading data from the storage device 17 and writing data into the storage device 17.

The internal switch 16 is configured, for example, with a high-speed crossbar switch. Communication via the internal switch 16 is performed in accordance with a protocol such as a Fibre Channel, iSCSI, or TCP/IP.

The storage device 17 is configured by including a plurality of physical drives 171 each being a physical recordable medium. The physical drive 171 is configured with a hard disk drive of a type such as SAS (Serial Attached SCSI), SATA (Serial ATA), FC (Fibre Channel), PATA (Parallel ATA), or SCSI, or with hardware such as semiconductor storage device (SSD). Note that the storage device 17 may be stored in the same housing as the one for the storage apparatus 10, or may be stored in a housing different from the one for the storage apparatus 10.

Figure 4:
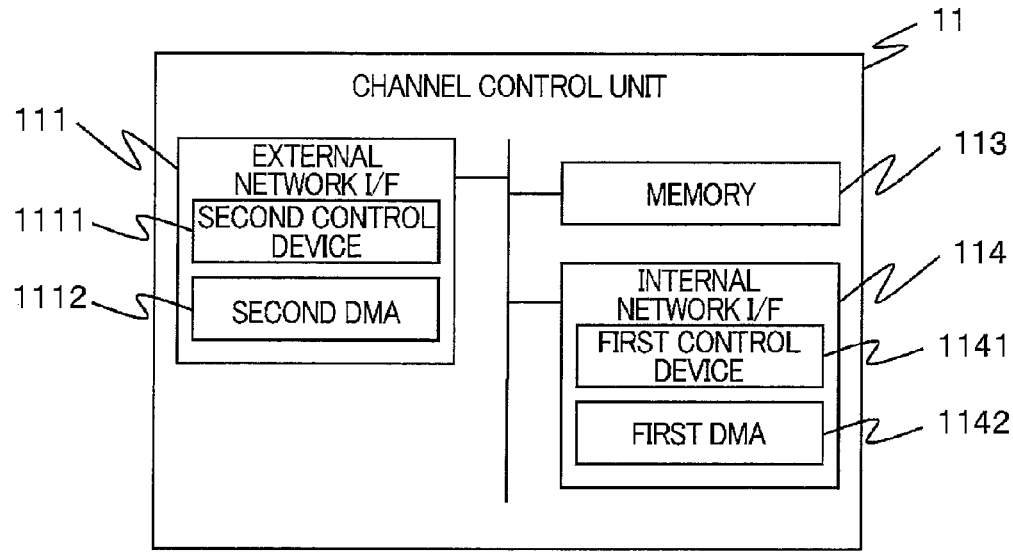
FIG. 4 is a diagram showing a hardware configuration of a channel control unit 11.

FIG. 4 shows a hardware configuration of the channel control unit 11. As shown in FIG. 4, the channel control unit 11 includes an external network interface having at least one port (network port) for communication with the host computer 3 (hereinafter referred to as an external network I/F 111 (a second data transfer device)), a memory 113, and an internal network interface having a port (network port) for communication with the processor unit 12 (hereinafter referred to as an internal network I/F 114 (a first data transfer device)).

The external network I/F 111 communicates with the host computer 3 via the storage network 5 in accordance with a communication code (communication protocol) used for the communication in the storage network 5. As shown in FIG. 4, the external network I/F 111 includes a control device configured with a semiconductor device (or a semiconductor integrated circuit) such as a CPU (Central Processing Unit), an MPU (Micro Processing Unit), or an ASIC (Application Specific Integrated Circuit) (hereinafter the control device is referred to as a second control device 1111), and a DMA (Direct Memory Access) (hereinafter the DMA is referred to as a second DMA 1112). The second DMA 1112 may be incorporated in the second control device 1111, or may be a separated body (separated package) from the second control device 1111.

The second control device 1111 communicates with the host computer 3 and the internal network I/F 114. The second control device 1111 controls the second DMA 1112 and thus transfers the data stored in the memory 113 to the host computer 3. On the other hand, the second control device 1111 controls the second DMA 1112 and thus stores the data transmitted from the host computer 3 into the memory 113.

The internal network I/F 114 communicates with the processor unit 12, the drive control unit 13, the cache memory 14, and the shared memory 15 via the internal switch 16. As shown in FIG. 4, the internal network I/F 114 includes a control device configured with a semiconductor device (or a semiconductor integrated circuit) such as a CPU, an MPU, or an ASIC (hereinafter the control device is referred to as a first control device 1141), and a DMA (hereinafter the DMA is referred to as a first DMA 1142). The first DMA 1142 may be incorporated in the first control device 1141, or may be a separated body (separated package) from the first control device 1141.

The first control device 1141 controls the first DMA 1142 and thus transfers to the cache memory 14 the data stored in the memory 113. Also, the first control device 1141 controls the first DMA 1142 and thus transfers to the memory 113 the data stored in the cache memory 14.

The memory 113 includes a ROM (Read Only Memory) and a RAM (Random Access Memory). The memory 113 provides a temporary storage area (data buffer) for data at the time of a data transfer between the external network I/F 111 and the internal network I/F 114, as well as a data transfer between the internal network I/F 114 and the cache memory 14. The memory 113 stores therein a micro program. By the external network I/F 111 or the internal network I/F 114 reading micro programs from the memory 113 and performing the micro programs thus read, various types of functions provided by the channel control unit 11 are implemented.

Figure 5:
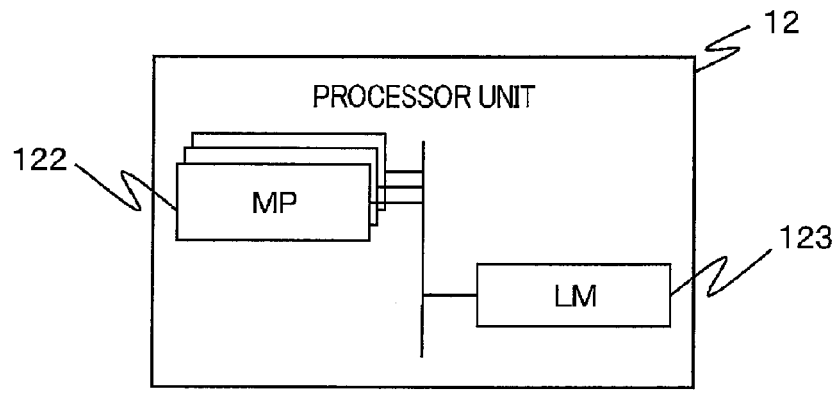
FIG. 5 is a diagram showing a hardware configuration of a processor unit 12.

FIG. 5 shows a hardware configuration of the processor unit 12. The processor unit 12 includes at least one microprocessor (Micro Processor) (hereinafter referred to as an MP 122), and a local memory (hereinafter referred to as an LM 123). The MP 122 is configured with a CPU, an MPU, an ASIC, and the like. The LM 123 stores therein a micro program. By the MP 122 reading the above-mentioned micro program from the LM 123 and executing the micro program, various types of functions provided by the processor unit 12 are implemented.

The MP 122 and the LM 123 are provided in various aspects so as to have a many-to-one relationship (for example, in a case where a plurality of MPs 122 utilize a common LM 123), or a many-to-many relationship (for example, in a case where each MP 122 is provided with a different LM 123) according to a type of the storage apparatus 10.

Figure 6:
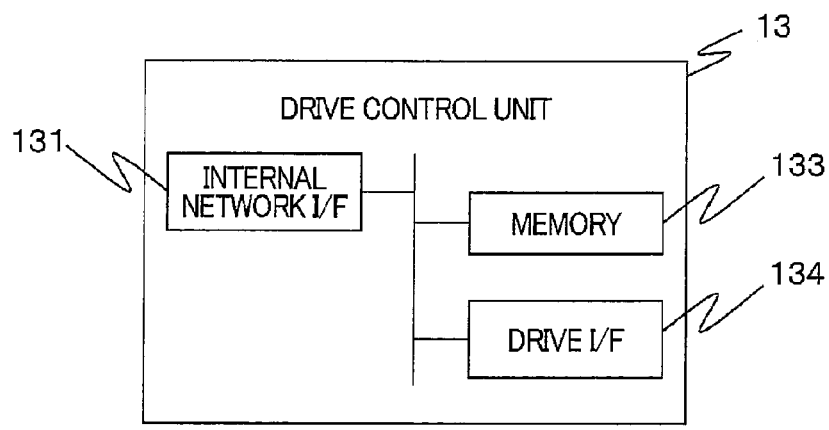
FIG. 6 is a diagram showing a hardware configuration of a drive control unit 13.

FIG. 6 shows a hardware configuration of the drive control unit 13. The drive control unit 13 includes an internal network interface (hereinafter referred to as an internal network I/F 131), a memory 133, and a drive interface (hereinafter referred to as a drive I/F 134).

The internal network I/F 131 includes a DMA and a computing control device configured with a CPU, an MPU, an ASIC, or the like. The DMA may be incorporated in the computing control device, or may be a separated body (separated package) from the computing control device. The internal network I/F 131 communicates with the channel control unit 11, the processor unit 12, the cache memory 14, and the shared memory 15 via the internal switch 16.

The drive I/F 134 communicates with the storage device 17 in accordance with a pre-determined communication method.

The memory 133 includes a ROM and a RAM. The memory 133 provides a temporary storage area for data (data buffer) at the time of a data transfer between the internal network I/F 131 and the drive I/F 134, as well as a data transfer between the internal network I/F 131 and the cache memory 14. The memory 133 stores therein a micro program. By the internal network I/F 131 or the drive I/F 134 reading the micro program from the memory 133 and performing the micro program thus read, various types of functions provided by the drive control unit 13 are implemented.

A maintenance device 18 shown in FIG. 3 controls the components of the storage apparatus 10 and monitors the states of the components. The maintenance device 18 is a personal computer, an office computer, and the like. The maintenance device 18, via the internal switch 16 or communication means such as LAN, communicates as needed, with the components of the storage apparatus 10 such as the channel control unit 11, the processor unit 12, the drive control unit 13, the cache memory 14, the shared memory 15, and the internal switch 16, to acquire operation information and the like from the components, and provides them to the management device 7. Furthermore, the maintenance device 18 makes settings of, controls of, and maintenance of the components (including installing and updating software) in accordance with the control information and operation information transmitted from the management device 7.

The management device 7 is a computer communicatively coupled to the maintenance device 18 via a LAN and the like. The management device 7 includes a user interface that uses a GUI (Graphic User Interface), CLI (Command Line Interface), and the like to control and monitor the storage apparatus 10.

Figure 7:
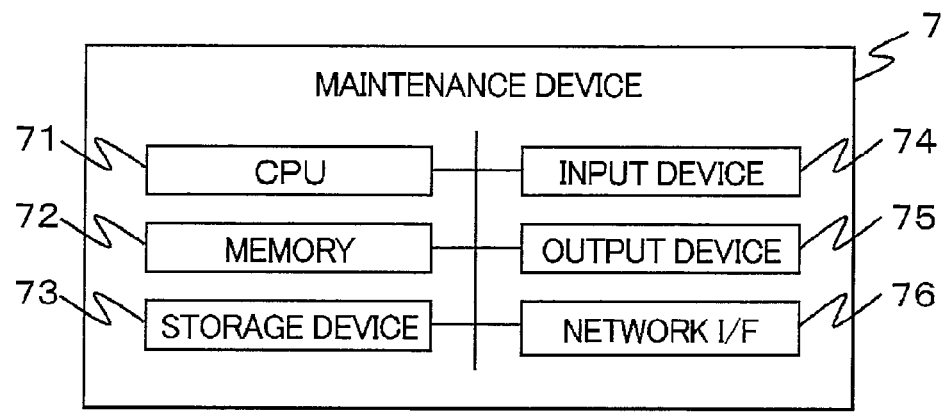
FIG. 7 is a diagram showing a hardware configuration of a management device 7.

FIG. 7 shows an example of hardware of an information processing device (computer) which can be utilized as a management device 7. As shown in FIG. 7, this device includes a CPU 71, a volatile or non-volatile memory 72 (RAM or ROM), a storage device 73 (for example, an HDD (Hard Disk Drive) or a semiconductor storage device (or, SSD (Solid State Drive))), an input device 74 such as a keyboard or a mouse, an output device 75 such as a liquid crystal monitor or a printer, and a network interface (a network I/F 76) to communicate with the maintenance device 18.

Figure 8:
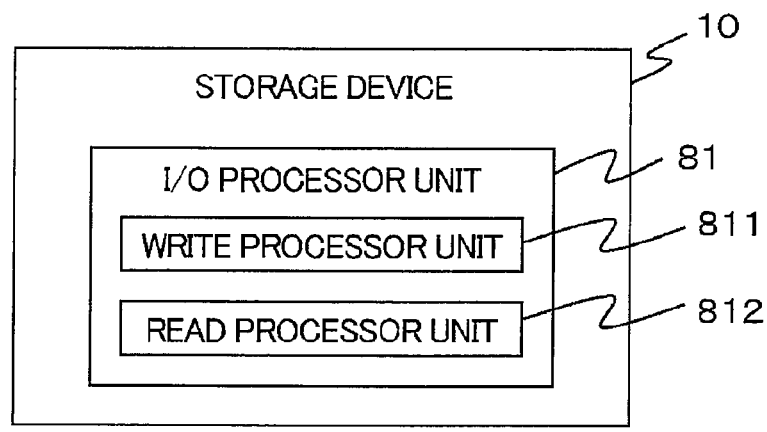
FIG. 8 is a diagram showing main functions of the storage apparatus 10.

FIG. 8 shows basic functions of the storage apparatus 10. As shown in FIG. 8, the storage apparatus 10 includes an I/O processor unit 81. The I/O processor unit 81 includes a write processor unit 811 that performs processing related to writing data to the storage device 17, and a read processor unit 812 that performs processing related to reading data from the storage device 17.

Figure 9:
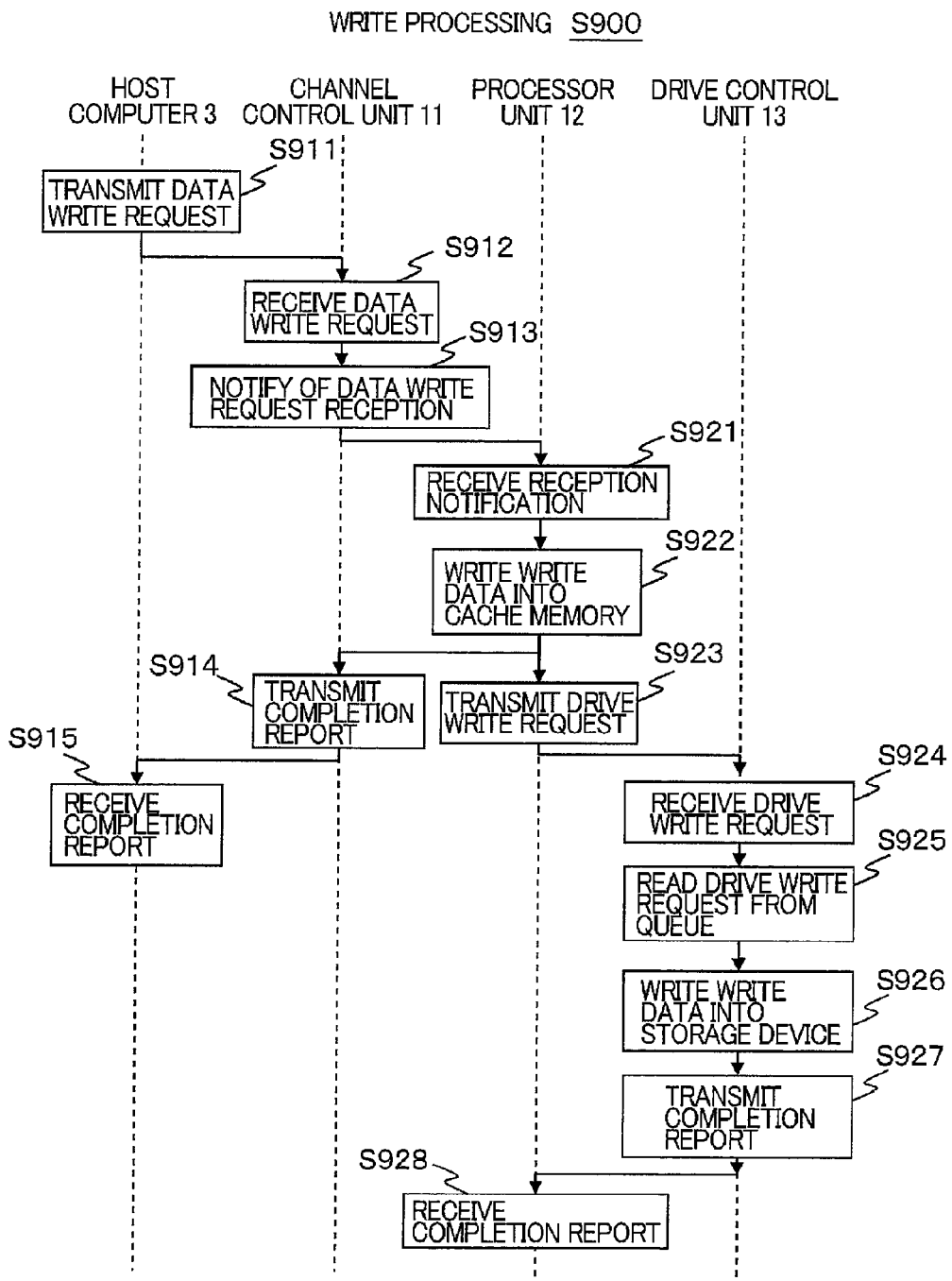
FIG. 9 is a flowchart explaining data write processing S900.

FIG. 9 is a flowchart explaining basic processing (hereinafter referred to as write processing S900) which is performed by the write processor unit 811 of the I/O processor unit 81 when the storage apparatus 10 receives a frame including a data write request from the host computer 3. In the following, the write processing S900 is described in conjunction with FIG. 9. Note that, in the description below, a character "S" prefixed to each reference numeral indicates a step.

A frame including a data write request transmitted from the host computer 3 is received by the channel control unit 11 of the storage apparatus 10 (S911, S912). Upon receipt of the frame, the channel control unit 11 notifies the processor unit 12 of the frame receipt (S913).

Upon receipt of the above-mentioned notification from the channel control unit 11 (S921), the processor unit 12 generates a drive write request on the basis of the data write request of the relevant frame, and stores the write data into the cache memory 14. The processor unit 12 then transmits the generated drive write request to the drive control unit 13 (S922, S923). The channel control unit 11 transmits a completion report to the host computer 3 (S914), and the host computer 3 receives the completion report (S915).

Upon receipt of the drive write request, the drive control unit 13 registers the drive write request to a write processing queue (S924). The drive control unit 13 reads the drive write request from the write processing queue as needed (S925). The drive control unit 13 reads from the cache memory 14 the write data specified by the read drive write request, and writes the read write data into a physical drive 171 (S926).

The drive control unit 13 then notifies the processor unit 12 of the report that writing of the write data requested by the drive write request has been completed (completion report) (S927), and the processor unit 12 receives the transmitted completion report (S928).

Figure 10:
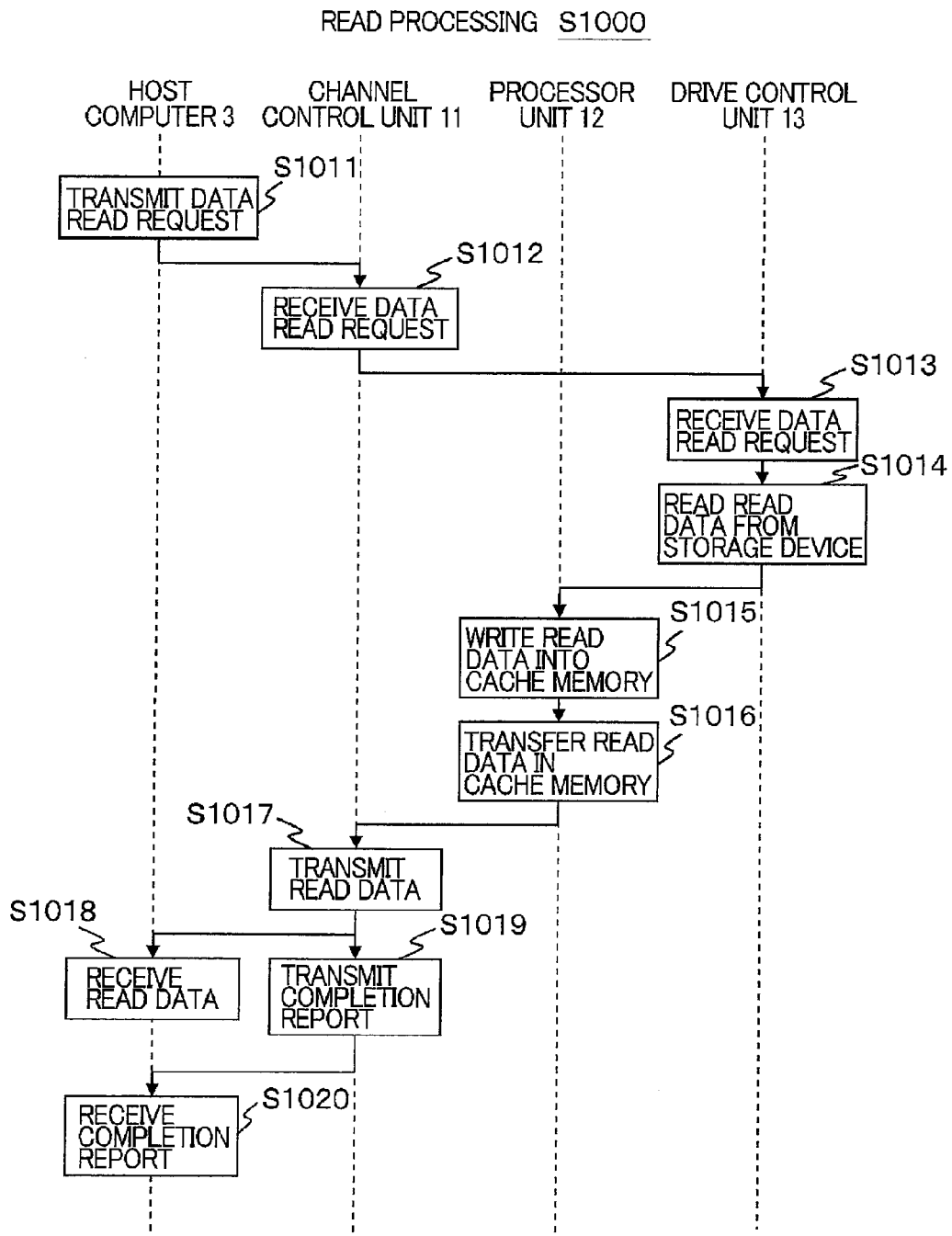
FIG. 10 is a flowchart explaining data read processing S1000.

FIG. 10 is a flowchart explaining I/O processing (hereinafter referred to as read processing S1000) which is performed by the read processor unit 812 of the I/O processor unit 81 in the storage apparatus 10 when the storage apparatus 10 receives a frame including a data read request from the host computer 3. In the following, the read processing S1000 is described in conjunction with FIG. 10.

A frame transmitted from the host computer 3 is received by the channel control unit 11 in the storage apparatus 10 (S1011, S1012). Upon receipt of the frame from the host computer 3, the channel control unit 11 notifies the drive control unit 13 of the frame receipt.

Upon receipt of the above-mentioned notification from the channel control unit 11 (S1013) the drive control unit 13 reads, from the storage device 17 (the physical drive 171), data specified by a data read request included in the received frame (for example, specified by an LBA (Logical Block Address)) (S1014). Note that the read processing from the storage device 17 (S1014) is omitted if there is any read data in the cache memory 14 (in a case of a cache hit). The processor unit 12 writes the data read by the drive control unit 13 into the cache memory 14 (S1015). The processor unit 12 transfers the data written into the cache memory 14 to the network I/F as needed (S1016).

The channel control unit 11 sequentially transmits to the host computer 3 the read data transmitted from the processor unit 12 (S1017, S1018). When the transmission of the read data is completed, the channel control unit 11 transmits a completion report to the host computer 3 (S1019), and the host computer 3 receives the transmitted completion report (S1020).

A network port included in the network I/F 36 of the host computer 3 (hereinafter referred to as a host port) is assigned a port ID (for example, a WWN (World Wide Name)) which is identification information to identify a device coupled to the storage network 5. The port ID is assigned to each of the network ports included in the network I/F 36. Thus, the network I/F 36 having a plurality of network ports for coupling to the storage network 5, for example, are assigned different port IDs for those network ports.

On the other hand, a network port provided for the channel control unit 11 of the storage apparatus 10 to couple to the storage network 5 (hereinafter referred to as a storage port) is also assigned a port ID (for example, a WWN or an MAC address).

Hereinafter, the port ID assigned to the network I/F 36 of the host computer 3 is referred to as the host port ID, and a port ID assigned to each network port provided to the channel control unit 11 is referred to as a channel port ID.

The storage apparatus 10 provides the host computer 3 with a storage area of the physical drive 171 on a logical unit (LU) basis. The logical unit is a logical storage area configured by allocating a storage area of the physical drive 171 with a predetermined allocation unit (hereinafter referred to as a physical page). For example, a logical unit is associated with a device file or a drive letter (drive name) in an operating system installed in the host computer 3. Each logical unit is assigned a logical unit number (LUN) which is a unique identification specific to the logical unit. The host computer 3 identifies each logical unit by using the LUN. For example, the LUN is set in a data input/output request transmitted from the host computer 3 to the storage apparatus 10.

The storage apparatus 10 recognizes a physical storage area provided by the physical drive 171 on a logical device (LDEV) basis, the logical device being a storage area logically set by using the physical storage area. Each logical device is assigned, as an identifier, a unique logical device number (LDEV number) specific to the logical device. A storage area of the logical device is configured by controlling, for example, a plurality of pieces of hardware with a RAID (Redundant Arrays of Inexpensive (or Independent) Disks) scheme (at least one of RAID 0 to 6).

Figure 11:
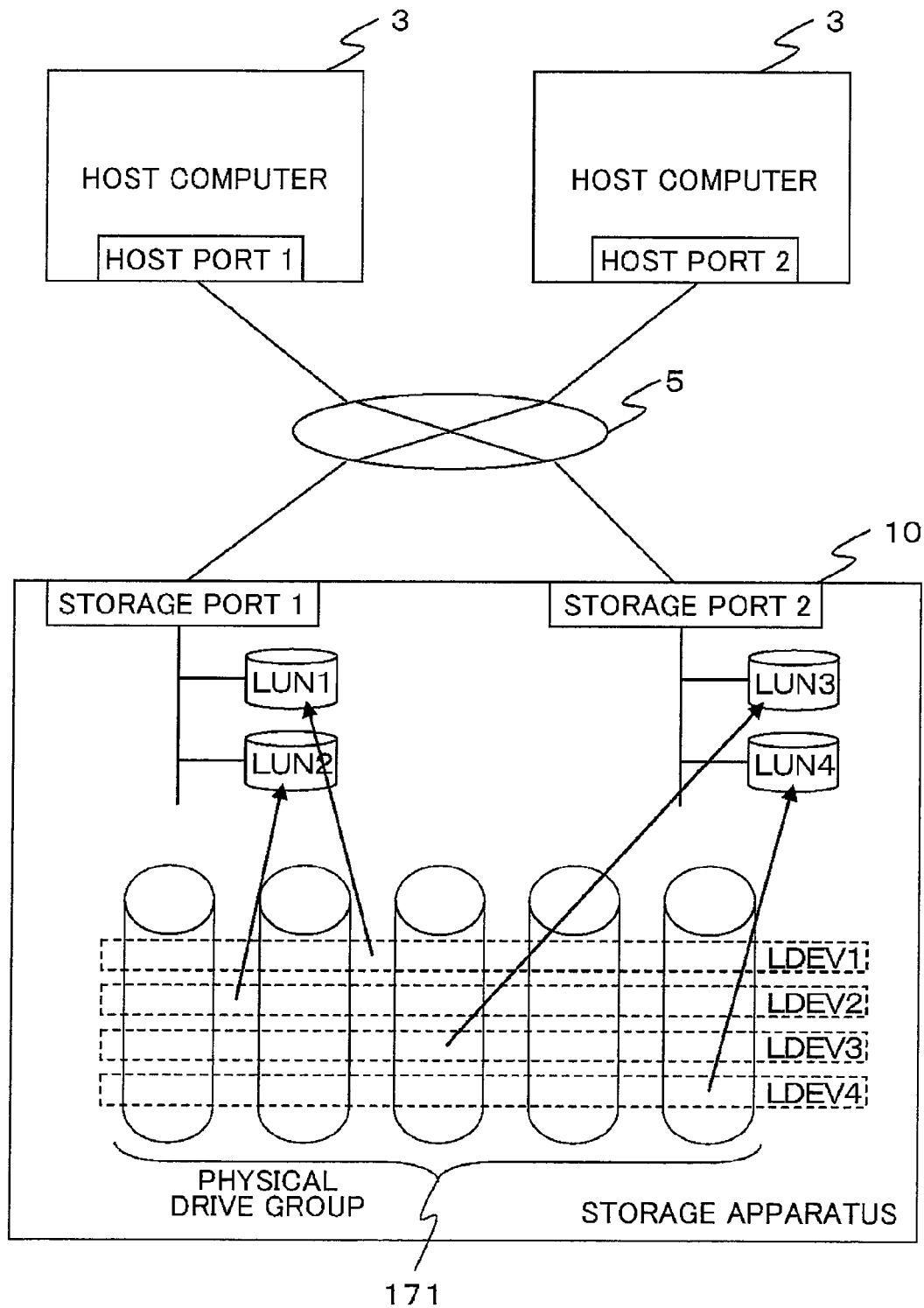
FIG. 11 is a schematic diagram explaining an access route (path) from the host computer 3 to the storage apparatus 10.

FIG. 11 is a schematic diagram explaining access routes (paths) from the host computer 3 to the storage apparatus 10. As shown in FIG. 11, an access route from the host computer 3 to the storage apparatus 10 can be identified by a combination of a host port ID (host port 1, host port 2, etc.), a storage port ID (storage port 1, storage port 2, etc.), an LUN (LUN1, LUN2, etc.), and an LDEV number (LDEV1, LDEV2, etc.).

FIG. 12 shows an example of a data format of a data write request 1200 which the host computer 3 transmits to the storage apparatus 10 to write data into the storage device 17 of the storage apparatus 10. FIG. 12 also shows an example of a data format of a data read request 1250 that the host computer 3 transmits to the storage apparatus 10 to read data from the storage device 17 of the storage apparatus 10.

As shown in FIG. 12, the data write request 1200 includes information such as an I/O command 1211, an LUN 1212, an address 1213, a transmission source port ID 1214, and write data 1215. A command which requests data write to the storage apparatus 10 is set in the I/O command 1211. A LUN of the logical unit into which the data is to be written is set in the LUN 1212. An address which specifies a storage area into which the data is to be written is set in the address 1213. A host port ID assigned to the network I/F 36 of the host computer 3 that has transmitted the request is set in the transmission source port ID 1214. A write data to be written into the storage device 17 according to the relevant request is set in the write data 1215.

As shown in FIG. 12, the data read request 1250 includes information such as an I/O command 1251, a LUN 1252, an address 1253, a transmission source port ID 1254, and a data size 1255. A command which requests data read from the storage apparatus 10 is set in the I/O command 1251. A LUN of the logical unit from which the data is to be read is set in the LUN 1252. An address which specifies the storage area from which the data is to be read is set in the address 1253. A host port ID assigned to the network I/F 36 of the host computer 3 that has transmitted the request is set in the transmission source port ID 1254. A data size of the data to be read from the storage device 17 according to the relevant request is set in the data size 1255.

Figure 13:
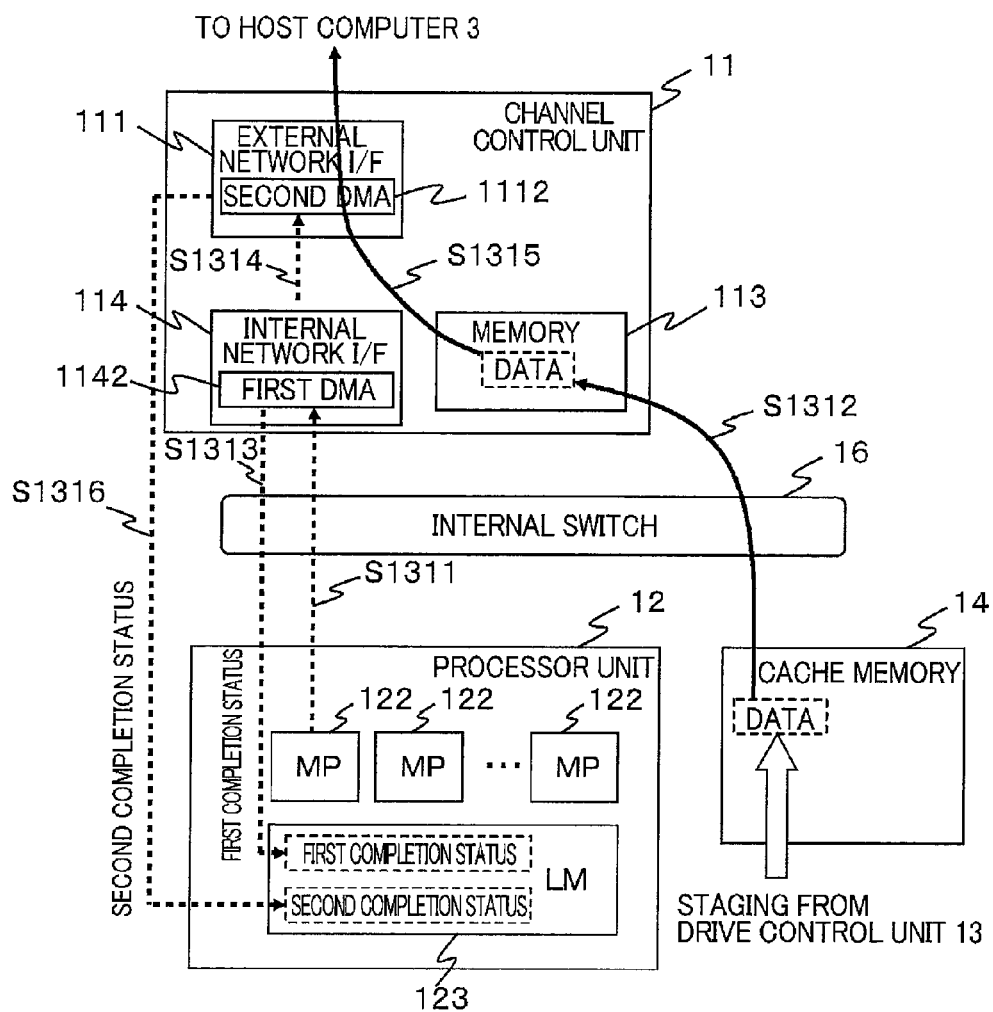
FIG. 13 is a diagram explaining operations related to a data transfer performed in the storage apparatus 10.
Figure 14:
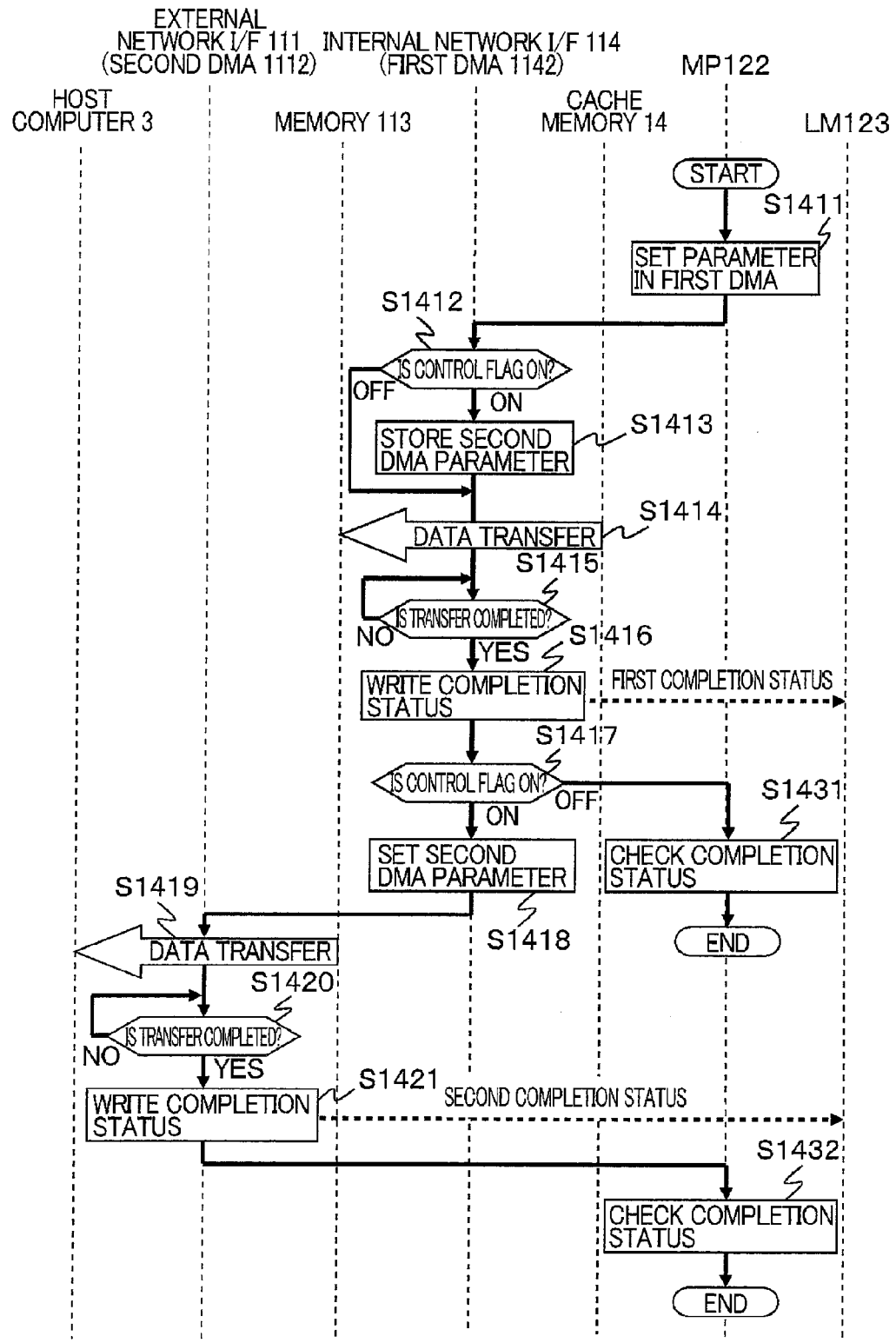
FIG. 14 is a flowchart explaining a time-series relationship between the operations shown in FIG. 13.

FIG. 13 is a diagram explaining operations related to a data transfer performed at the storage apparatus 10, specifically is a diagram explaining operations performed when the channel control unit 11 (data transfer control device) reads data stored in the cache memory 14 (transfer source device) and transmits the read data to the host computer 3 (transfer destination device). FIG. 14 is a flowchart explaining a time-series relationship between the operations shown in FIG. 13.

The operations shown in FIG. 13 and FIG. 14 are performed according to a data read request 1250 transmitted from the host computer 3, for example, and are performed at the time of processing of S1016 to 1017 in FIG. 10, for example. In the following, the operations are described in conjunction with FIG. 13 and FIG. 14.

First, an MP 122 (other device) of the processor unit 12 sets the first DMA 1142 to have a data transfer parameter (hereinafter referred to as a transfer parameter 1500) (S1311, S1411). Data to be transferred by use of the transfer parameter 1500 is, for example, data staged to the cache memory 14 by the drive control unit 13.

Here, the transfer parameter 1500 for the first DMA 1142 may be set directly in the first DMA 1142 by the MP 122 in the above described manner. Alternatively, the transfer parameter 1500 may be transmitted from the MP 122 to the first control device 1141, and then the first control device 1141 having received the transfer parameter 1500 may set the transfer parameter 1500 in the first DMA 1142. In other words, the MP 122 may set the transfer parameter 1500 in the first DMA 1142 via the first control device 1141.

In a case where the above-mentioned operations are performed according to the data read request 1250 transmitted from the host computer 3, a setting of the transfer parameter 1500 is repeated as many times as necessary for the data read request 1250. The necessary number of times is, for example, equivalent to the number of CCW (Channel Command Word) included in a CCW chain.

Figure 15:
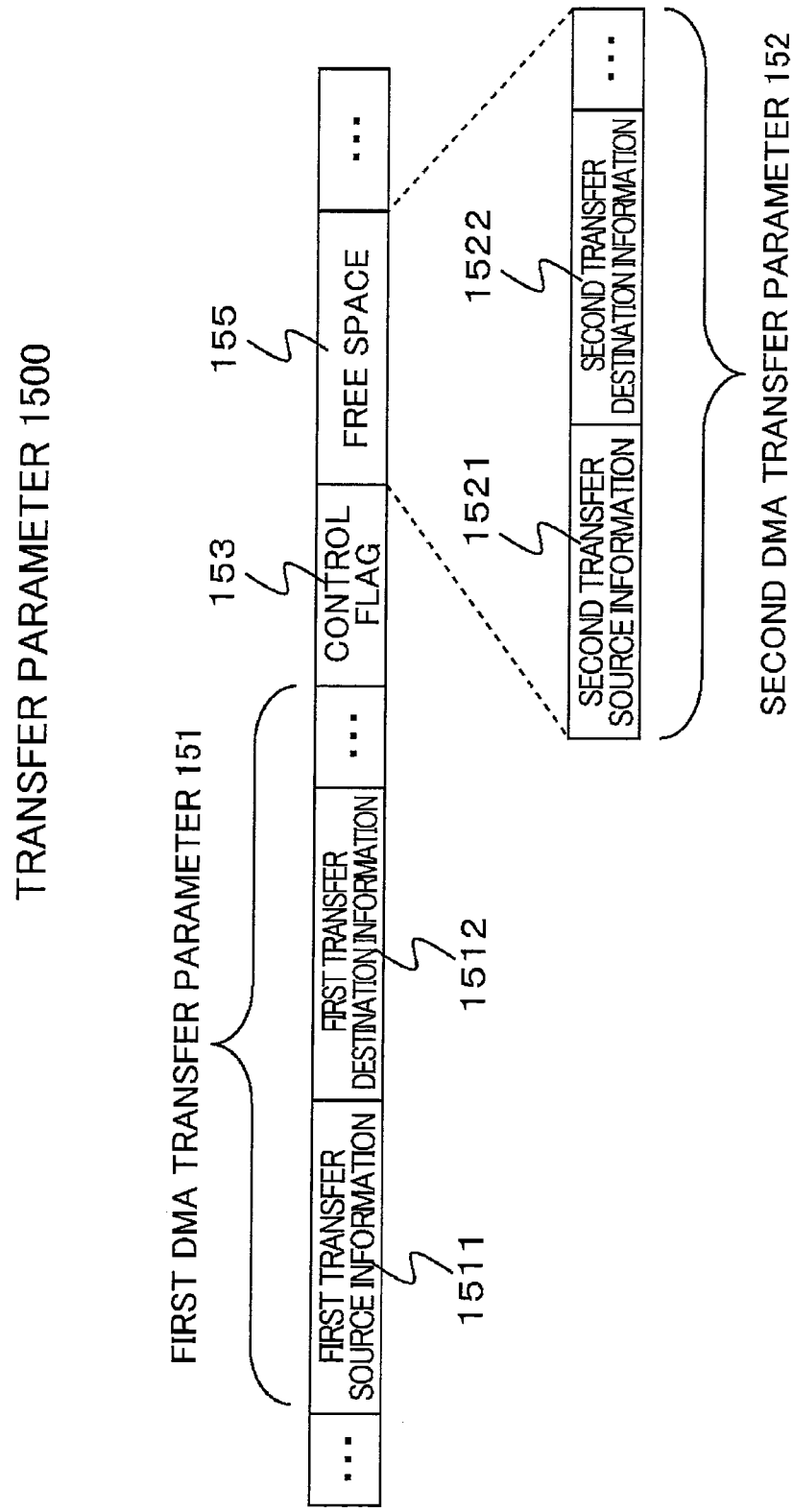
FIG. 15 is an example of a data structure of a transfer parameter 1500.

FIG. 15 shows a data structure of the transfer parameter 1500. As shown in FIG. 15, the transfer parameter 1500 includes a parameter for a data transfer of the first DMA 1142 (hereinafter referred to as a first DMA transfer parameter 151 (a first transfer parameter)), as well as a parameter for a data transfer of the second DMA 1112 (hereinafter referred to as a second DMA transfer parameter 152 (a second transfer parameter)). As shown in FIG. 15, the second DMA transfer parameter 152 is set in, for example, a free space 155 of the data format of the transfer parameter 1500.

The first DMA transfer parameter 151 includes first transfer source information 1511 and first transfer destination information 1512. Information indicating a data transfer source regarding a data transfer by the first DMA 1142 is set in the first transfer source information 1511. Information indicating a data transfer destination regarding a data transfer by the first DMA 1142 is set in the first transfer destination information 1512.

For example, in a case where the first DMA 1142 transfers data directing from the cache memory 14 to the memory 113, an address of the cache memory 14 is set in the first transfer source information 1511, and an address of the memory 113 is set in the first transfer destination information 1512. On the other hand, in a case, for example, where the first DMA 1142 transfers data directing from the memory 113 to the cache memory 14, an address of the memory 113 is set in the first transfer source information 1511, and an address of the cache memory 14 is set in the first transfer destination information 1512.

The second DMA transfer parameter 152 includes second transfer source information 1521 and second transfer destination information 1522. Information indicating a data transfer source regarding a data transfer by the second DMA 1112 is set in the second transfer source information 1521. Information indicating a data transfer destination regarding a data transfer by the second DMA 1112 is set in the second transfer destination information 1522.

For example, in a case where the second DMA 1112 transfers data directing from the memory 113 to the host computer 3, an address of the memory 113 is set in the second transfer source information 1521, and information indicating a data storage location of the transfer destination at the host computer 3 is set in the second transfer destination information 1522. On the other hand, in a case, for example, where the second DMA 1112 transfers data directing from the host computer 3 to the memory 113, the information indicating the data storage location of the transfer source at the host computer 3 is set in the second transfer source information 1521, and the address of the memory 113 is set in the second transfer destination information 1522.

Contents of the first DMA transfer parameter 151 and the second DMA transfer parameter 152 are set according to a management method for data in the storage apparatus 10, such as a management method for the storage area of the cache memory 14, and a management method for the storage area of the memory 113.

When the transfer parameter 1500 for the first DMA 1142 is set (S1311, S1411), the internal network I/F 114 refers to a content of a control flag 153 in the transfer parameter 1500 (S1412).

Information on whether or not the second DMA transfer parameter 152 has been set in the transfer parameter 1500 is set in the above-mentioned control flag 153. The content of the control flag 153 is set by the MP 122. When only the first DMA 1142 is activated by the transfer parameter 1500, the MP 122 sets the control flag 153 to "OFF." When a data transfer by the first DMA 1142 is followed by a data transfer by the first DMA 1142, the MP 122 sets the control flag 153 to "ON." Thus, when the control flag 153 is set to "ON", a second DMA transfer parameter 152 will be set in the transfer parameter 1500.

When the control flag 153 is set to "ON" in S1412 (S1412: ON), the internal network I/F 114 stores the second DMA transfer parameter 152 included in the transfer parameter 1500, in the memory 113 or the storage area provided for the internal network I/F 114 (S1413). When the control flag 153 is set to "OFF" in S1412 (S1412: OFF), the process proceeds to S1414.

In S1414 (S1312), the first DMA 1142 starts a data transfer according to the first DMA transfer parameter 151 of the transfer parameter 1500 (a transfer of data stored in the cache memory 14 to the memory 113 (a first data transfer)).

While the data transfer is in progress, the internal network I/F 114 monitors in real time whether or not the data transfer is completed (S1415). When determining that the data transfer by the first DMA 1142 has been completed (S1415: YES), the internal network I/F 114 writes a completion status (hereinafter referred to as a first completion status) to an LM 123 of the MP 122 (S1416, S1313). Accordingly, the MP 122 recognizes that the data transfer by the first DMA 1142 has been completed.

In S1417, the internal network I/F 114 refers to the content of the control flag 153 (S1417). When the control flag 153 is set to "ON" (S1417: ON), the internal network I/F 114 sets the second DMA 1112 of the external network I/F 111 to have the second DMA transfer parameter 152 which is stored in S1413 (S1314, S1418).

Here, the second DMA transfer parameter 152 for the second DMA 1112 may be directly set in the second DMA 1112 by the internal network I/F 114 in the above described manner. Alternatively, the second DMA transfer parameter 152 may be transmitted from the second DMA 1112 to the second control device 1111, and then the second control device 1111 having received the second DMA transfer parameter 152 may set the second DMA transfer parameter 152 in the second DMA 1112. In other words, the internal network I/F 114 may set the second DMA transfer parameter 152 in the second DMA 1112 via the second control device 1111.

In S1417, when the control flag 153 is set to "OFF" (S1417: OFF), the process is terminated. Note that the first completion status written into the LM 123 is referenced as needed by the MP 122 (S1431).

When the second DMA transfer parameter 152 is set by the internal network I/F 114 (S1314, S1418), the second DMA 1112 starts a data transfer (a transfer of data stored in the memory 113 to the host computer 3 (a second data transfer)) by use of the second DMA transfer parameter 152 (S1315, S1419).

While the data transfer is in progress, the external network I/F 111 monitors in real time whether or not the data transfer is completed (S1420). When the data transfer is completed (S1420: YES), the external network I/F 111 writes a completion status for the data transfer (hereinafter referred to as a second completion status) into the LM 123 of the MP 122 (S1316, S1421). Note that the first completion status and the second completion status written into the LM 123 are referenced as needed by the MP 122 (S1432).

As has been described above, in the storage apparatus 10 of the present embodiment, when data stored in the cache memory 14 is transmitted to the host computer 3 by use of the first DMA 1142 and the second DMA 1112 provided to the channel control unit 11, the MP 122 writes the second DMA transfer parameter 152 to the free space 155 of the transfer parameter 1500 for the first DMA 1142, and transmits the transfer parameter 1500 to the first DMA 1142. When the data transfer to the first DMA 1142 is completed, the internal network I/F 114 sets the second DMA transfer parameter 152 in the second DMA 1112 to activate the second DMA 1112.

In this manner, in the storage apparatus 10 of the present embodiment, it is not the MP 112 which sets the second DMA transfer parameter 152 in the second DMA 1112, but the first DMA 1142 which sets the second DMA transfer parameter 152 in the second DMA 1112 to activate the second DMA 1112. For this reason, the second DMA 1112 can be activated immediately after the data transfer by the first DMA 1142 is completed. This allows a high-speed data transfer of data stored in the cache memory 14 to the host computer 3, even in a case where there is a long communication distance between a component that activates a data transfer (the processor unit 12) and a component that is activated (the first DMA 1142, the second DMA 1112). Thus, the storage apparatus 10 can produce better throughput and exert a better response performance to the host computer 3.

In addition, setting the control flag 153 allows the MP 122 to control whether or not to cause the internal network I/F 114 to activate the second DMA 1112 (S1314, S1418).

The above description has been given of a case where the data stored in the cache memory 14 is transmitted to the host computer 3 by use of the first DMA 1142 and the second DMA 1112 provided to the channel control unit 11. However, the mechanism described above can be applied to various other cases. For example, the mechanism can be applied to a case where the storage apparatus 10 stores the write data transmitted from the host computer 3 into the cache memory 14 according to the data write request 1200 transmitted from the host computer 3 (for example, the operations performed in S911 to S913, S921, S922 of FIG. 9). In this case, when the MP 122 sets the second DMA 1112 to have the transfer parameter 1500 of the second DMA transfer parameter 152, for example, the MP 122 transmits the transfer parameter 1500 by attaching to its free space 155 the first DMA transfer parameter 151. The transmission of the transfer parameter 1500 thus set allows the second DMA 1112 to set the first DMA transfer parameter 151 in the first DMA 1142 to activate the first DMA 1142 (without using the MP122) at the time when the second DMA 1112 completes its data transfer according to the second DMA transfer parameter 152.

The configuration described above can be applied to, for example, a data transfer between the storage device 17 and the cache memory 14 which is performed by the DMAs of the internal network I/F 131 and the drive I/F 134 of the drive control unit 13. Also, the application range of the configuration described above is not limited to the field of technique for the storage apparatus 10, but may include various cases where a data transfer is performed by a plurality of data transfer entities in cooperation via buffers.

The data transfer entity is not limited to a DMA, but may be another type of a data transfer entity which is externally activated by setting a transfer parameter.

Figure 16:
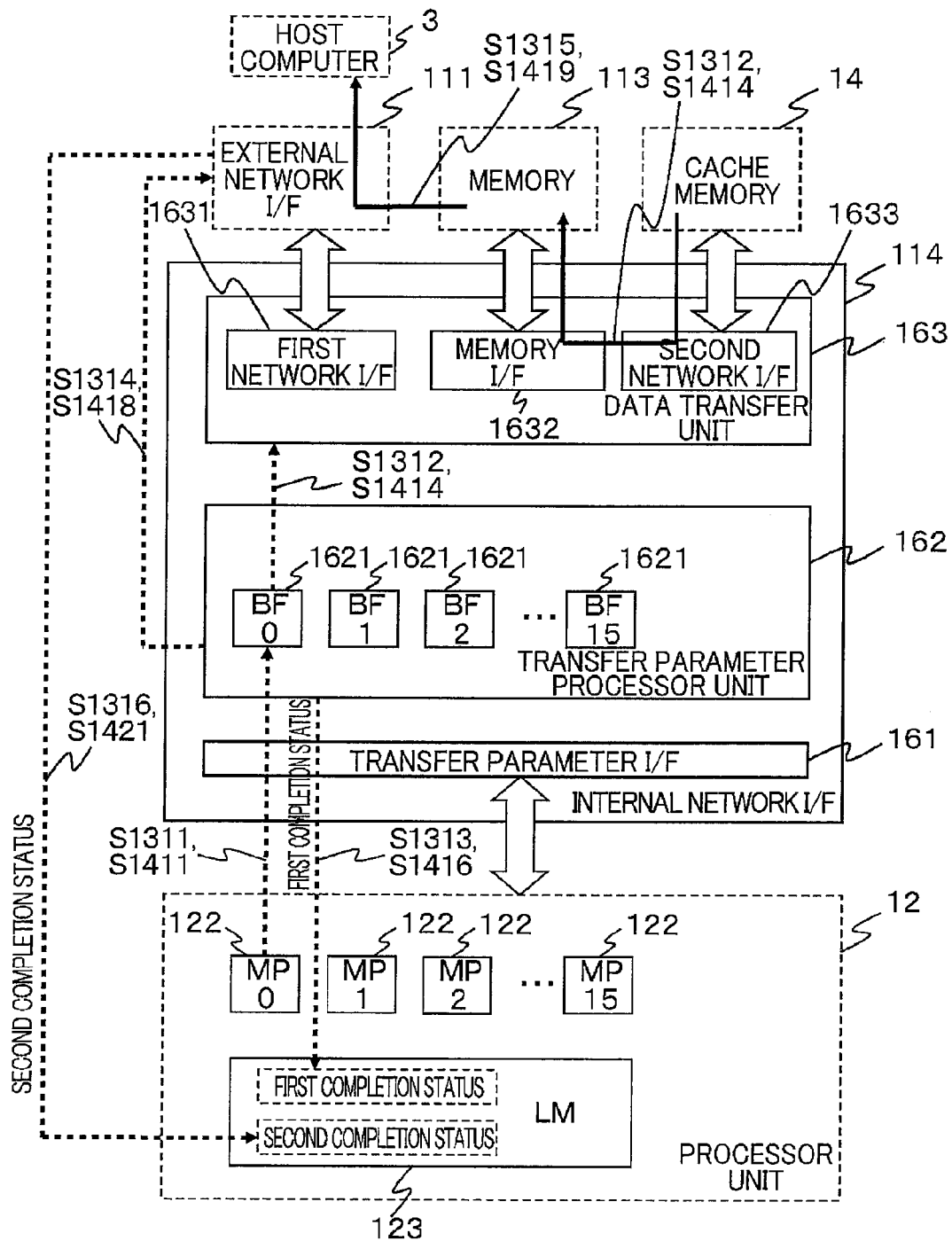
FIG. 16 is a diagram explaining functions of an internal network I/F 114 related to the operations explained along with FIGS. 13 and 14.

FIG. 16 is a diagram explaining functions of the internal network I/F 114 related to the operations described in conjunction with FIG. 13 and FIG. 14. In FIG. 13 and FIG. 14, each reference numeral prefixed with a character "S" indicates the same reference numeral as shown in FIG. 13 and FIG. 14.

The internal network I/F 114 has functions of a transfer parameter I/F 161, a transfer parameter processor unit 162, and a data transfer unit 163. As shown in FIG. 16, the transfer parameter processor unit 162 has at least as many number of buffers 1621 (abbreviated as "BF" in FIG. 16) as the number of MPs 122 provided to the processor unit 12.

The data transfer unit 163 includes a first network I/F 1631, a memory I/F 1632, and a second network I/F 1633. These functions are implemented by the hardware provided to the internal network I/F 114 or by the first control device 1141 of the internal network I/F 114 reading a program stored in the internal network I/F 114 or the memory 113 and executing the program thus read.

The transfer parameter I/F 161 receives a transfer parameter 1500 transmitted from any of at least one MP 122 provided to the processor unit 12, and stores the received transfer parameter 1500 in the buffer 1621 corresponding to the MP 122 (S1311, S1411).

When the transfer parameter 1500 is stored in the buffer 1621, the data transfer unit 163 starts a data transfer by use of the memory I/F 1632 and the second network I/F 1633 (a transfer of data stored in the cache memory 14 to the memory 113) according to the first DMA transfer parameter 151 of the transfer parameter 1500 (S1312, S1414).

When the data transfer by the first DMA 1142 is completed, the transfer parameter processor unit 162 writes the first completion status into the LM 123 of the MP 122 (S1313, S1416). Note that, when the processor unit 12 includes a plurality of MPs 122, the transfer parameter processor unit 162 writes the first completion status into a storage area of an LM 123 which is allocated to the MP 122 which has set the transfer parameter 1500 in S1311 (S1411).

When the control flag 153 is set to "ON" (S1412), the transfer parameter processor unit 162 sets the second DMA transfer parameter 152 stored in the buffer 1621, in the second DMA 1112 of the external network I/F 111 to activate the second DMA 1112 (S1314, S1418). The second DMA 1112 starts a data transfer (a transfer of data stored in the memory 113 to the host computer 3) according to the second DMA transfer parameter 152 (S1315, S1419).

When the data transfer by the second DMA 1112 is completed (S1420: YES), the external network I/F 111 writes the second completion status into the LM 123 of the MP 122 (S1316, S1421). Note that, when the processor unit 12 includes a plurality of MPs 122, the external network I/F 111 writes the second completion status into the storage area of the LM 123 which is allocated to the MP 122 which has set the transfer parameter 1500 in S1311 (S1411).

Figure 17:
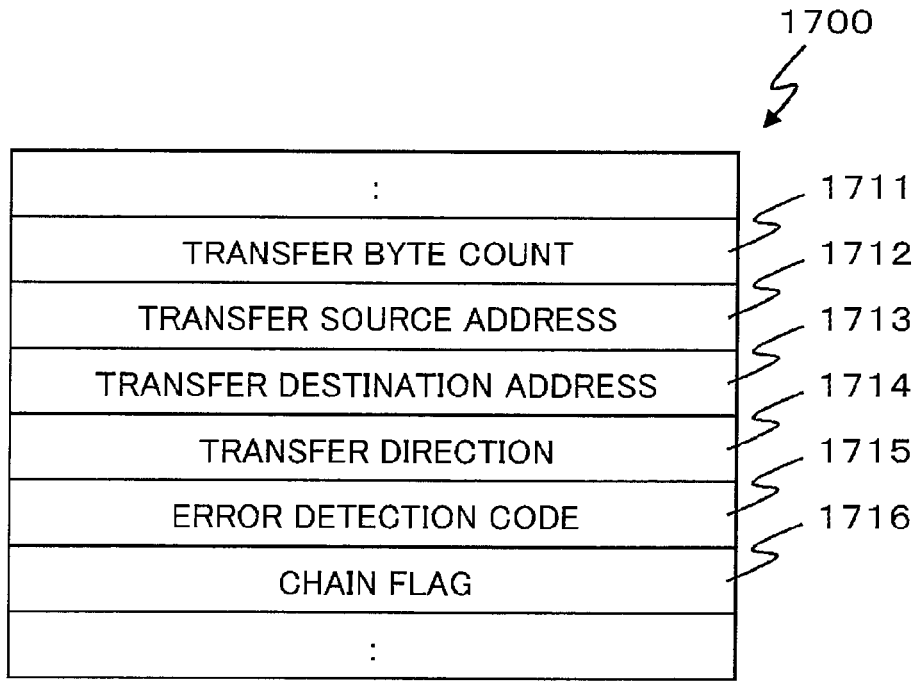
FIG. 17 is an example (data 1700) of a transfer parameter 151 for a first DMA or a transfer parameter for a second DMA 152.

FIG. 17 shows an example (a data 1700) of the first DMA transfer parameter 151 (the second DMA transfer parameter 152 is similarly formed as well). As shown in FIG. 17, the data 1700 includes information such as a transfer byte count 1711, a transfer source address 1712, a transfer destination address 1713, a transfer direction 1714, an error detection code 1715, and a chain flag 1716. The data 1700 has a data length of for example, 10 words (=4 bytes). Note that the data length of the data 1700 is not limited to this value. The data length may be a variable length.

A data length of data to be transferred is set in the transfer byte count 1711. The first transfer source information 1511 or the second transfer source information 1521 is set in the transfer source address 1712. The first transfer destination information 1512 or the second transfer destination information 1522 is set in the transfer destination address 1713. Information indicating a transfer direction is set in the transfer direction 1714, for example, the information including whether the data transfer is directing from the cache memory 14 to the memory 113 or whether the data transfer is directing from the memory 113 to the cache memory 14.

An error detection code of the data to be transferred (for example, CRC (Cyclic Redundancy Check) code or LRC (Longitudinal Redundancy Check) code) is set in the error detection code 1715. If an error is detected by the error detection code, the channel control unit 11 stops the data transfer, for example, and outputs error information to the maintenance device 18. Information indicating, for example, whether or not there exists a subsequent CCW in a CCW chain is set in the chain flag 1716.

Figure 18:
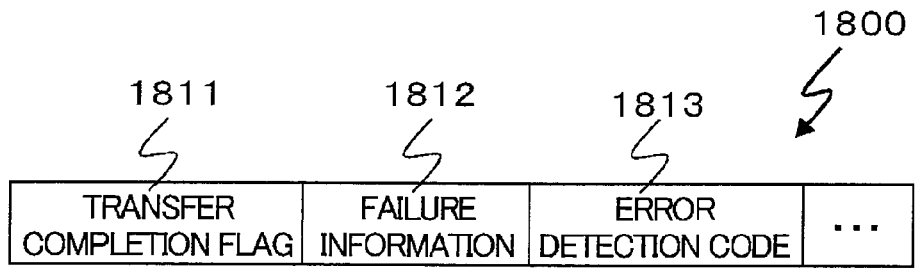
FIG. 18 is an example (data 1800) of a first completion status or a second completion status.

FIG. 18 shows an example (data 1800) of the first completion status or the second completion status. As shown in FIG. 18, the data 1800 includes information such as a transfer completion flag 1811, failure information 1812, and an error detection code 1813.

A value indicating whether the data transfer is completed or not is set in the transfer completion flag 1811. Information showing a content of a trouble when the trouble occurs during the data transfer is set in the failure information 1812. The MP 122 detects whether or not any trouble occurs at the time of a data transfer by referring to the failure information 1812. For example, the content of the error detection code 1715 in FIG. 17 is set as it is in the error detection code 1813. The MP 122 detects whether or not any error occurs at the time of a data transfer by referring to the error detection code 1813.

Second Embodiment

As shown in FIG. 14, in the first embodiment, the internal network I/F 114 checks whether the data transfer by the first DMA 1142 is completed or not (S1415) so as to prevent starting a data transfer by the second DMA 1112 before the completion of the data transfer by the first DMA 1142. After confirming that the data transfer by the first DMA 1142 is completed (S1415:YES), the internal network I/F 114 sets the second DMA transfer parameter 152 in the second DMA 1112 to activate the second DMA 1112 (S1418). In a second embodiment to be described below, the memory 113 checks whether the data transfer by the first DMA 1142 is completed or not so as to prevent starting a data transfer by the second DMA 1112 before the completion of the data transfer by the first DMA 1142.

Figure 19:
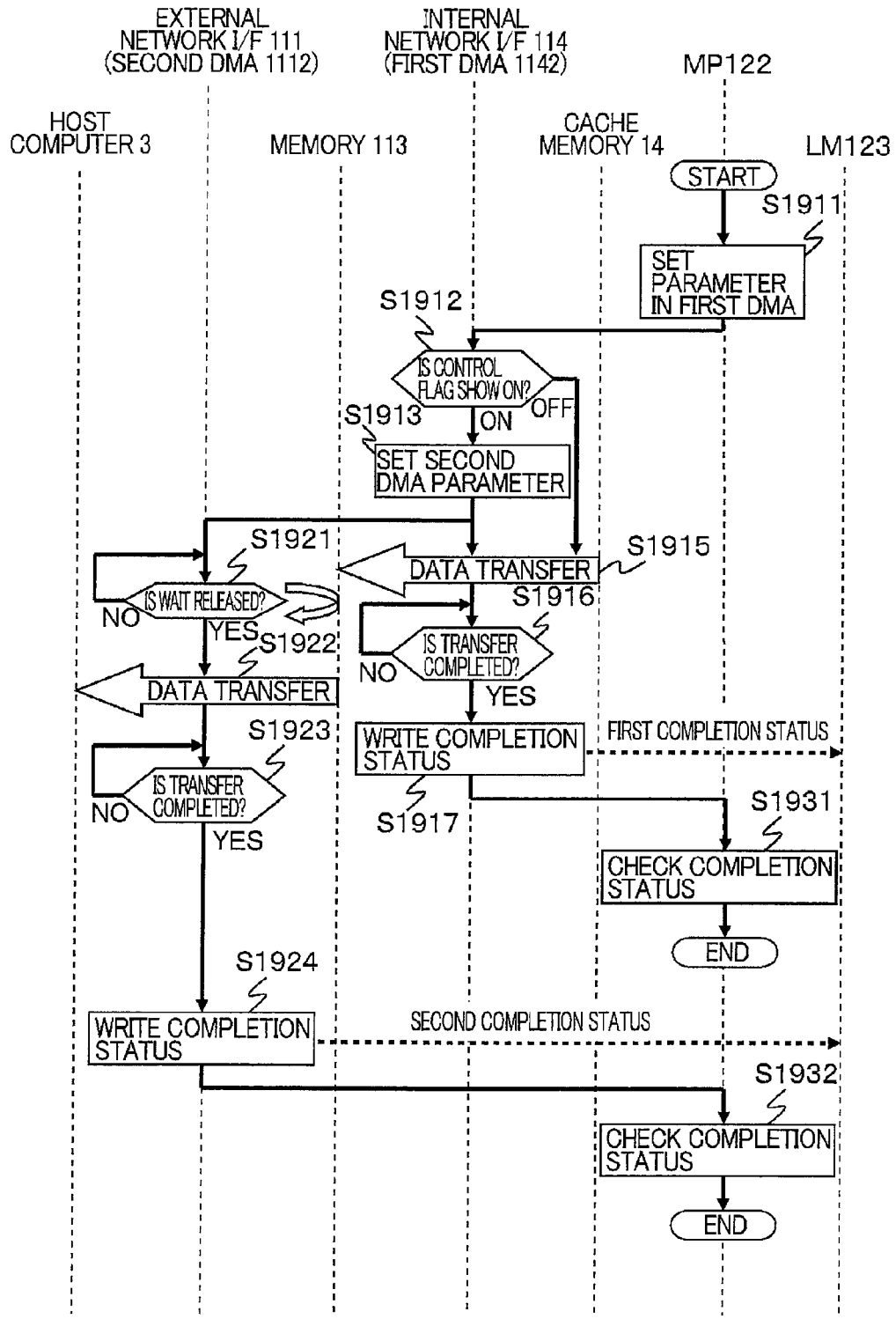
FIG. 19 is a flowchart explaining operations of a storage apparatus 10 in a second embodiment.

FIG. 19 is a flowchart explaining operations of the storage apparatus 10 in the second embodiment. In the following, these operations are described in conjunction with FIG. 19.

First, the MP 122 of the processor unit 12 sets a data transfer parameter (hereinafter referred to as a transfer parameter 1500) in the first DMA 1142 of the internal network I/F 114 of the channel control unit 11 (S1911).

The internal network I/F 114 then refers to the content of the control flag 153 of the transfer parameter 1500 (S1912). When the control flag 153 has been set to "ON" (S1912: ON), the process proceeds to S1913. When the control flag 153 has been set to "OFF" (S1912: OFF), the process proceeds to S1915.

In S1915, the first DMA 1142 starts a data transfer according to the first DMA transfer parameter 151 of the transfer parameter 1500 (a transfer of data stored in the cache memory 14 to the memory 113).

While the data transfer is in progress, the internal network I/F 114 monitors in real time whether or not the data transfer is completed (S1916). When the data transfer by the first DMA 1142 is completed (S1916: YES), the internal network I/F 114 writes a first completion status into the LM 123 of the MP 122 (S1917). Note that the first completion status written into the LM 123 is referenced as needed by the MP 122 (S1931).

In S1913, the internal network I/F 114 sets the second DMA 1112 of the external network I/F 111 to have the second DMA transfer parameter 152 included in the transfer parameter 1500 (S1913). The second DMA 1112 starts its operation for a data transfer according to the second DMA transfer parameter 152 (a transfer of the data stored in the memory 113 to the host computer 3), and initiates an access to the memory 113.

While the data transfer by the first DMA 1142 is in progress, the memory 113 prohibits the second DMA 1112 from accessing the data transferred from the cache memory 14. Thus, an access attempted by the second DMA 1112 during the data transfer by the first DMA 1142 is held in a wait state (queued state) in the memory 113 until the data transfer by the first DMA 1142 is completed. When the data transfer by the first DMA 1142 is completed, the wait state is released (S1921:YES), and a data transfer by the second DMA 1112 is started (S1922).

While the data transfer is in progress, the external network I/F 111 monitors in real time whether or not the data transfer is completed (S1923). When the data transfer is completed (S1923: YES), the external network I/F 111 writes a second completion status into the LM 123 of the MP 122 (S1924). Note that the first completion status and the second completion status written into the LM 123 are referenced as needed by the MP 122 (S1932).

As has been described above, in the second embodiment, the memory 113 monitors whether the data transfer by the first DMA 1142 is completed or not, and thus the load for the internal network I/F 114 is reduced accordingly. For this reason, resources of the internal network I/F 114 can be allocated to other processing, thereby allowing the storage apparatus 10 to have better throughput and a better response performance to the host computer 3.

In the first embodiment, the internal network I/F 114 handles both processing of writing the first completion status (S1416) and activation of the data transfer by the second DMA 1112 (S1418), and thus the activation of the data transfer by the second DMA 1112 is delayed accordingly. However, in the second embodiment, since the second DMA transfer parameter 152 is set in the second DMA 1112 in advance, the data transfer by the second DMA 1112 can be activated by the external network I/F 111 immediately after the completion of the data transfer by the first DMA 1142, without involving the internal network I/F 114. Thus, the processing time for the entire data transfer is reduced, thereby allowing the storage apparatus 10 to have better throughput and a better response performance to the host computer 3.

In addition, in the second embodiment, the second DMA transfer parameter 152 is set in advance before the start of the data transfer by the first DMA 1142 (S1913). For this reason, the control flag 153 does not need to be checked several times as in the first embodiment (S1412 and S1417 in FIG. 14), thus the overall processing time is reduced, accordingly.

Third Embodiment

Figure 20:
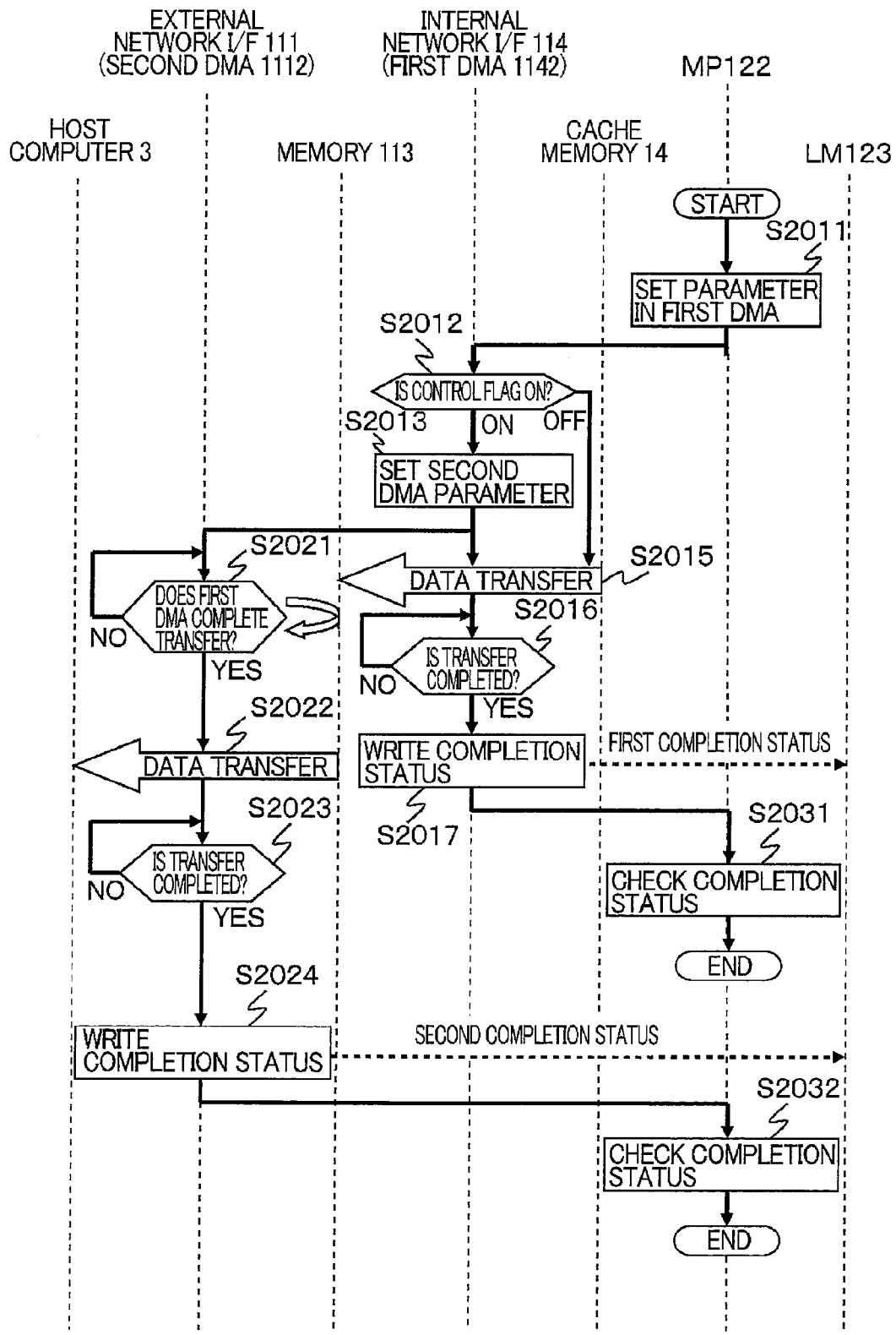
FIG. 20 is a flowchart explaining operations of a storage apparatus 10 in a third embodiment.

In the second embodiment, the memory 113 monitors whether the data transfer by the first DMA 1142 is completed or not. In a third embodiment on the other hand, the external network I/F 111 monitors whether the data transfer by the first DMA 1142 is completed or not. FIG. 20 is a flowchart explaining operations of the storage apparatus 10 in the third embodiment. In the following, these operations are described in conjunction with FIG. 20. Note that processing in S2011 and S2012 of FIG. 20 is the same as that in S1911 and S1912 of FIG. 19.

In S2012, when the control flag 153 is "OFF" (S2012: OFF), the process proceeds to S2015. In S2015, the first DMA 1142 starts a data transfer according to the first DMA transfer parameter 151 of the transfer parameter 1500 (a transfer of data stored in the cache memory 14 to the memory 113). The processing in S2016, S2017, and S2031 is the same as that in S1916, S1917, and S1931 of FIG. 19.

In S2012, when the control flag 153 is "ON" (S2012: ON), the process proceeds to S2013. In S2013, the internal network I/F 114 sets the second DMA 1112 of the external network I/F 111 to have the second DMA transfer parameter 152 included in the transfer parameter 1500.

When the second DMA transfer parameter 152 is set, the external network I/F 111 starts monitoring whether the data transfer by the first DMA 1142 is completed or not (S2021).

This monitoring is performed, for example, by determining whether or not an access is allowed to the data identified by the second transfer source information 1521 of the second DMA transfer parameter 152. This monitoring is performed as needed (for example, periodically at intervals such as of several microseconds).

When the data transfer by the first DMA 1142 is completed (S2021: YES), the second DMA 1112 starts a data transfer (a transfer of the data stored in the memory 113 to the host computer 3) according to the second DMA transfer parameter 152 (S2022). Note that the processing in S2023, S2024, and S2032 is the same as that in S1923, S1924, and S1932 of FIG. 19.

As has been described above, in the third embodiment, the external network I/F 111 monitors whether the data transfer by the first DMA 1142 is completed or not, and thus the load of the internal network I/F 114 is reduced accordingly. For this reason, resources for the internal network I/F 114 can be allocated to other processing. Thus, the storage apparatus 10 can produce better throughput and exert a better response performance to the host computer 3.

In the first embodiment, the internal network I/F 114 handles both processing of writing the first completion status (S1416) and activation of the data transfer by the second DMA 1112 (S1418), and thus the activation of the data transfer by the second DMA 1112 is delayed accordingly. However, in the third embodiment, since the second DMA transfer parameter 152 is set in the second DMA 1112 in advance, the data transfer by the second DMA 1112 can be activated by the external network I/F 111 immediately after the completion of the data transfer by the first DMA 1142, without involving the internal network I/F 114. Thus, the processing time for the entire data transfer is reduced.

In addition, in the third embodiment, the second DMA transfer parameter 152 is set in advance before the start of the data transfer by the first DMA 1142 (S2013). For this reason, the control flag 153 does not need to be checked several times as in the first embodiment (S1412 and S1417 in FIG. 14), thus the overall processing time is reduced, accordingly.

Fourth Embodiment

In the third embodiment, the external network I/F 111 monitors whether the data transfer by the first DMA 1142 is completed or not. Thus, if it takes a longer time for the first DMA 1142 to transfer the data, the external network I/F 111 accesses to the memory 113 several times for checking, thus resources of the external network I/F 111 and the memory 113 are used wastefully. This problem will become apparent especially when the internal network I/F 114 is configured to receive the transfer parameters 1500 transmitted from a plurality of MPs 122 provided to the processor unit 12.

In a case of the above described configuration, a data transfer by one MP 122 may cause another MP 122 to wait for its start of a data transfer. Even in such a case, the external network I/F 111 starts to check (access to the memory 113) whether the data transfer by the first DMA 1142 is completed or not (S2021) immediately after the second DMA transfer parameter 152 is set in the second DMA 1112 by the internal network I/F 114 (S2013). Thus, for the time period from when the second DMA transfer parameter 152 is set in the second DMA 1112 to when the data transfer by the first DMA 1142 is completed, resources (resources to be used for monitoring whether the data transfer by the first DMA 1142 is completed or not) are used wastefully by the external network I/F 111 and the memory 113.

The fourth embodiment made to address this is configured so that a notification of the start of a data transfer is transmitted from the internal network I/F 114 to the external network I/F 111 when the data transfer by the first DMA 1142 is started, and thus the external network I/F 111 starts to monitor whether the data transfer by the first DMA 1142 is completed or not after receiving the notification of the start.

Figure 21:
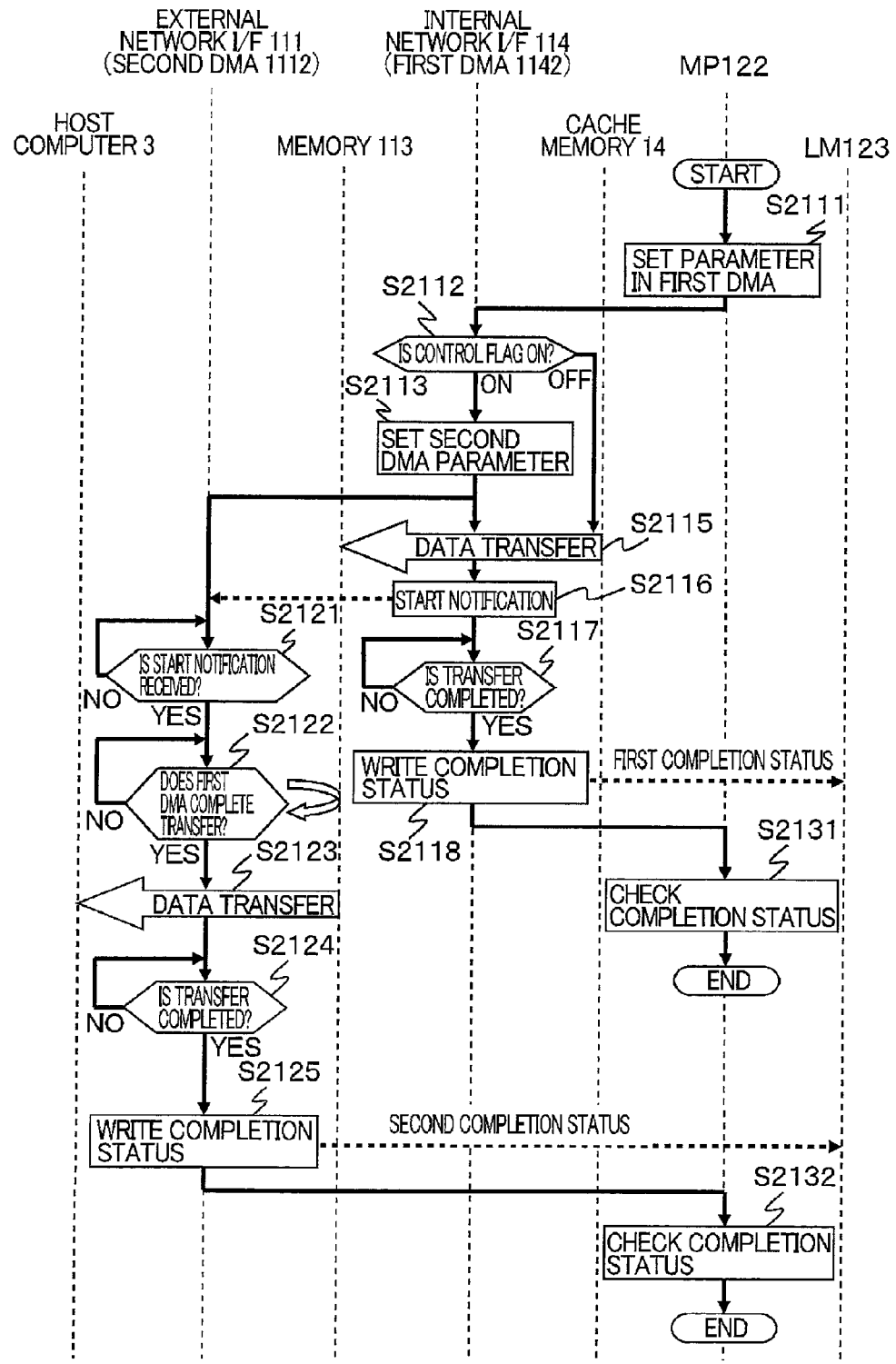
FIG. 21 is a flowchart explaining operations of a storage apparatus 10 in a fourth embodiment.
Figure 22:
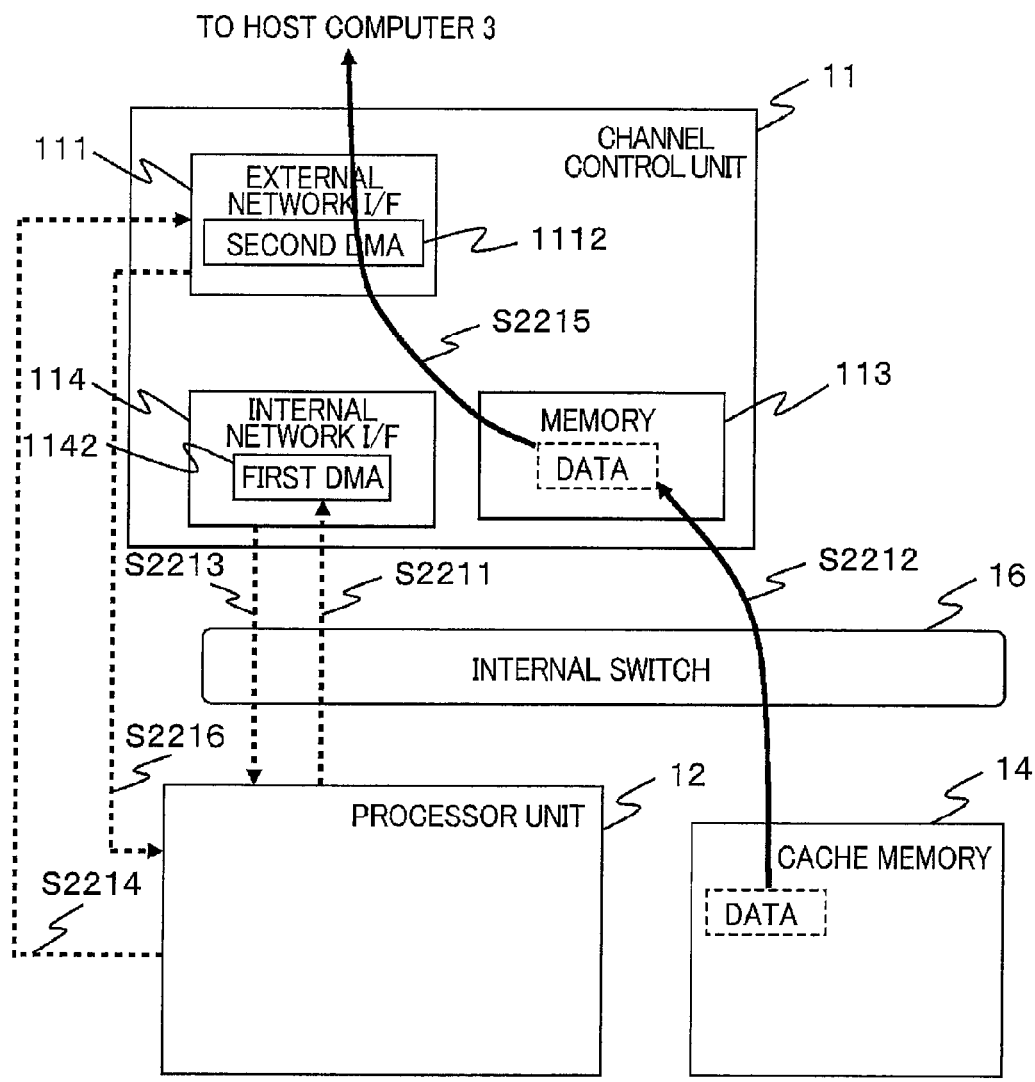
FIG. 22 is an example of a hardware configuration of the storage apparatus 10.
Figure 23:
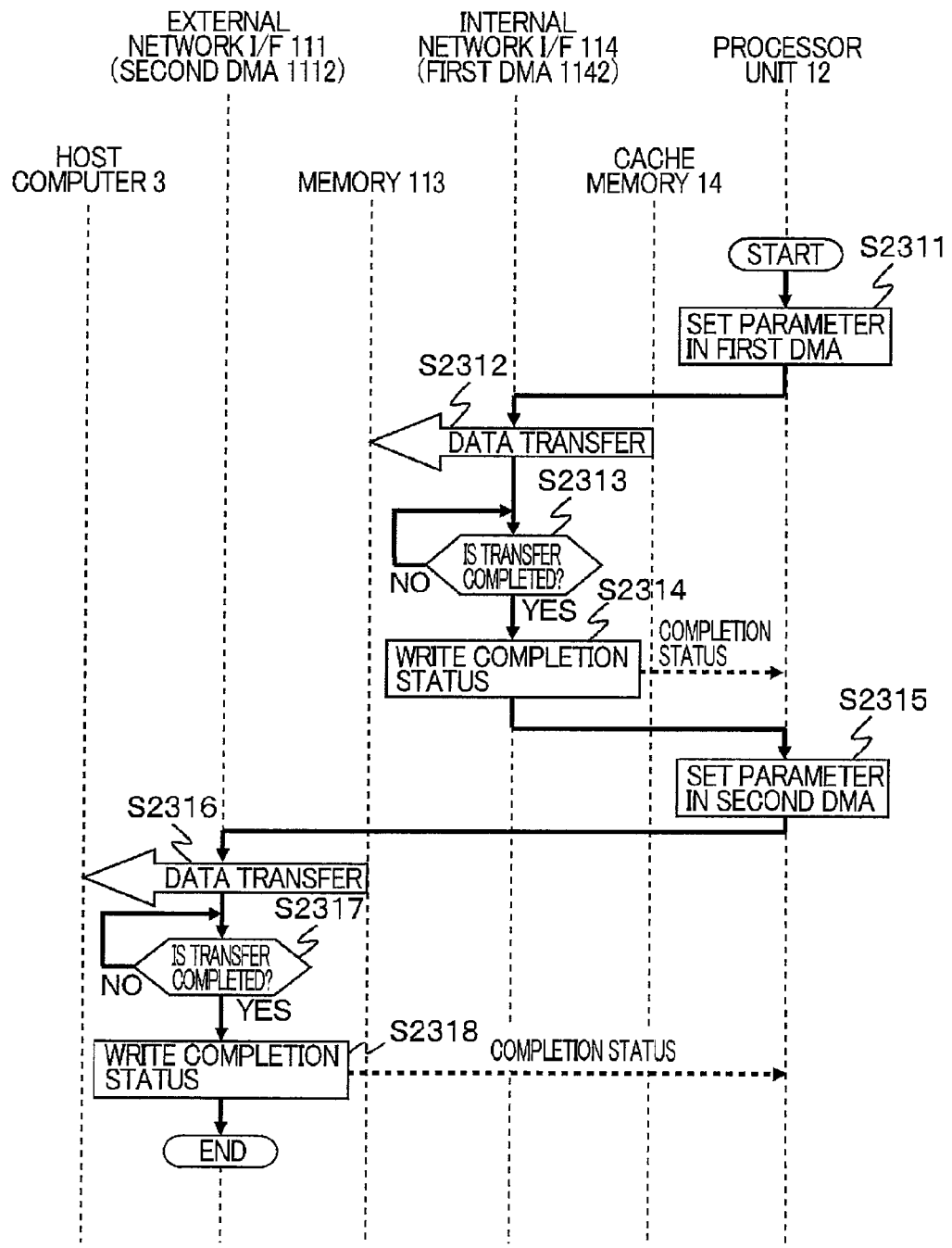
FIG. 23 is a diagram explaining an example of operations related to a data transfer.

FIG. 21 is a flowchart explaining operations of the storage apparatus 10 in the fourth embodiment. In the following, these operations are described in conjunction with FIG. 21. Note that the processing in S2111, S2112, S2113, and S2115 of FIG. 21 is the same as that in S2011, S2012, S2013, and S2015 of FIG. 20.

In S2116, the internal network I/F 114 transmits to the external network I/F 111 a notification stating that the data transfer by the first DMA 1142 is started (hereinafter the notification is referred to as a start notification). The processing in S2118 and S2131 is the same as that in S2017 and S2031 of FIG. 20.

On the other hand, in response to the setting of the second DMA transfer parameter 152 in the second DMA 1112, the external network I/F 111 starts to stand by to receive a start notification transmitted from the internal network I/F 114 (S2121). Upon receipt of the start notification (S2121: YES), the external network I/F 111 starts to monitor whether the data transfer by the first DMA 1142 is completed or not (S2122). The monitoring is repeated (for example, periodically at intervals such as of several microseconds) until an access is allowed to the data identified by the second transfer source information 1521 of the second DMA transfer parameter 152. The processing in S2123, S2124, S2125, and S2132 is the same as that in S2022, S2023, S2024, and S2032 of FIG. 20.

Note that the above-mentioned monitoring is performed, for example, by determining whether or not an access is allowed to the data identified by the second transfer source information 1521 of the second DMA transfer parameter 152 (while the data transfer by the first DMA 1142 is in progress, for example, an access from the external network I/F 111 to the data identified by the second transfer source information 1521 is prohibited).

As has been described above, in the fourth embodiment, upon receipt of the start notification, the external network I/F 111 starts to monitor whether the data transfer by the first DMA 1142 is completed or not. Thus, the external network I/F 111 does not monitor whether the data transfer by the first DMA 1142 is completed or not, for the time period from when the internal network I/F 114 sets the second DMA 1112 to have the second DMA transfer parameter 152 to when the data transfer by the first DMA 1142 is started. It is thus possible to avoid wasting the resources of the external network I/F 111 and the memory 113 during this time period. Accordingly, the resources of the external network I/F 111 and the memory 113 can be allocated to other processing. Thus, the storage apparatus 10 can produce better throughput and exert a better response performance to the host computer 3.

In the above, preferable embodiments of the present invention have been described. These embodiments, however, are provided for exemplary purposes to describe the present invention, and are not intended to limit the scope of the present invention only to these embodiments. The present invention may be implemented in various other embodiments.

The invention claimed is:

1. A data transfer device functioning as a first data transfer device in a data transfer control device which is configured to transfer data from a transfer source device to a transfer destination device via a memory, the data transfer device comprising:

the first data transfer device coupled to the transfer source device and the memory, and configured to perform a first data transfer of the data from the transfer source device to the memory according to a first transfer parameter, when the first transfer parameter is set; and a second data transfer device coupled to the transfer destination device, the memory and the first data transfer device, and configured to perform a second data transfer of the data from the memory to the transfer destination device according to a second transfer parameter, when the second transfer parameter is set, wherein the data transfer device is configured to:

receive the first transfer parameter containing the second transfer parameter;

perform the first data transfer according to the first transfer parameter; and set the second transfer parameter contained in the first transfer parameter to the second data transfer device.

2. The data transfer device according to claim 1, wherein:

the data transfer device is configured to determine whether the first data transfer according to the first transfer parameter is completed or not, and to set the second data transfer device to have the second transfer parameter contained in the first transfer parameter when determining that the first data transfer is completed;

after receiving the setting of the second transfer parameter from the first data transfer device, the second data transfer device is configured to send to the memory a data read request for the second data transfer;

when receiving the data read request while the first data transfer is in progress, the memory is configured to hold the data read request thus received in a wait state until the first data transfer is completed, and to start the second data transfer after the first data transfer is completed;

after receiving the setting of the second transfer parameter from the first data transfer device, the second data transfer device is configured to determine whether the first data transfer is completed or not by accessing the memory, and to start the second data transfer when determining that the first data transfer is completed;

when starting the first data transfer, the first data transfer device is configured to send to the second data transfer device a start notification stating that the first data transfer is started;

after receiving the start notification, the second data transfer device is configured to start to access the memory;

the first data transfer device is configured to receive settings of first transfer parameters, and to perform the first data transfer according to each of the first transfer parameters thus received;

when receiving the settings of the first transfer parameters, the first data transfer device is configured to determine whether each of the received first transfer parameters contains the second transfer parameter or not;

when the first transfer parameter does not contain the second transfer parameter, the first data transfer device is configured to perform the first data transfer according to the first transfer parameter;

when the first transfer parameter contains the second transfer parameter, the first data transfer device is configured to perform the first data transfer according to the first transfer parameter, and also to set the second data transfer device to have the second transfer parameter contained in the first transfer parameter;

the first data transfer device includes a first DMA (Direct Memory Access) which is configured to perform the first data transfer according to the first transfer parameter;

the second data transfer device includes a second DMA which is configured to perform the second data transfer according to the second transfer parameter;

after completing the first data transfer, the first data transfer device is configured to notify a first completion status of the first data transfer;

after completing the second data transfer, the second data transfer device is configured to notify a second completion status of the second data transfer;

the first transfer parameter includes first transfer source information and first transfer destination information, the first transfer source information indicating a storage location in the transfer source device where data to be transferred by the first data transfer is stored, the first transfer destination information indicating a storage location in the memory where the data is to be stored;

the second transfer parameter includes second transfer source information and second transfer destination information, the second transfer source information indicating a storage location in the memory where data to be transferred by the second data transfer is stored, the second transfer destination information indicating a storage location in the transfer destination device where the data is to be stored;

the data transfer control device is included in a channel control unit in a storage apparatus including the channel control unit that is configured to communicate with a host computer; a drive control unit that is configured to communicate with a storage device; a cache memory; a processor unit that is configured to perform a data transfer between the channel control unit, the drive control unit, and the cache memory; and an internal switch that communicatively couples the channel control unit and the processor unit;

the memory is included in the channel control unit;

the transfer source device is the cache memory;

the transfer destination device is the host computer;

each of the devices is a microprocessor included in the processor unit;

the processor unit includes a memory and a plurality of the microprocessors;

after completing the first data transfer, the first data transfer device is configured to write a first completion status of the first data transfer into a storage area in the memory allocated to the microprocessor which has set the first transfer parameter; and after completing the second data transfer, the second data transfer device is configured to write a second completion status of the second data transfer into a storage area in the memory allocated to the microprocessor which has set the first transfer parameter.

3. The data transfer device according to claim 1, wherein the data transfer device is configured to determine whether the first data transfer according to the first transfer parameter is completed or not, and to set the second data transfer device to have the second transfer parameter contained in the first transfer parameter when determining that the first data transfer is completed.

4. The data transfer device according to claim 1, wherein after receiving the setting of the second transfer parameter from the first data transfer device, the second data transfer device is configured to send to the memory a data read request for the second data transfer, and when receiving the data read request while the first data transfer is in progress, the memory is configured to hold the data read request thus received in a wait state until the first data transfer is completed, and thereafter when the first data transfer is completed, the memory is configured to start the second data transfer.

5. The data transfer device according to claim 1, wherein, after receiving the setting of the second transfer parameter from the first data transfer device, the second data transfer device is configured to determine whether the first data transfer is completed or not by accessing the memory, and to start the second data transfer when determining that the first data transfer is completed.

6. The data transfer device according to claim 5, wherein when starting the first data transfer, the first data transfer device is configured to send to the second data transfer device a start notification stating that the first data transfer is started, and after receiving the start notification, the second data transfer device is configured to start to access the memory.

7. The data transfer device according to claim 6, wherein the first data transfer device is configured to receive settings of first transfer parameters, and to perform the first data transfer according to each of the first transfer parameters thus received.

8. The data transfer device according to claim 1, wherein: when receiving the settings of the first transfer parameters, the first data transfer device is configured to determine whether each of the received first transfer parameters contains the second transfer parameter or not; when the first transfer parameter does not contain the second transfer parameter, the first data transfer device is configured to perform the first data transfer according to the first transfer parameter; and when the first transfer parameter contains the second transfer parameter, the first data transfer device is configured to perform the first data transfer according to the first transfer parameter, and also to set the second data transfer device to have the second transfer parameter contained in the first transfer parameter.

9. The data transfer device according to claim 1, wherein the first data transfer device includes a first DMA (Direct Memory Access) which is configured to perform the first data transfer according to the first transfer parameter, and the second data transfer device includes a second DMA which is configured to perform the second data transfer according to the second transfer parameter.

10. The data transfer device according to claim 1, wherein after completing the first data transfer, the first data transfer device is configured to notify a first completion status of the first data transfer, and after completing the second data transfer, the second data transfer device is configured to notify a second completion status of the second data transfer.

11. The data transfer device according to claim 1, wherein the first transfer parameter includes first transfer source information and first transfer destination information, the first transfer source information indicating a storage location in the transfer source device where data to be transferred by the first data transfer is stored, the first transfer destination information indicating a storage location in the memory where the data is to be stored, and the second transfer parameter includes second transfer source information and second transfer destination information, the second transfer source information indicating a storage location in the memory where data to be transferred by the second data transfer is stored, the second transfer destination information indicating a storage location in the transfer destination device where the data is to be stored.

12. The data transfer device according to claim 1, wherein: the data transfer control device is included in a channel control unit in a storage apparatus including: the channel control unit that is configured to communicate with a host computer; a drive control unit that is configured to communicate with a storage device; a cache memory; a processor unit that is configured to perform a data transfer between the channel control unit, the drive control unit, and the cache memory; and an internal switch that is configured to communicatively couple the channel control unit and the processor unit; the memory is included in the channel control unit; the transfer source device is the cache memory; the transfer destination device is the host computer.

13. The data transfer device according to claim 12, wherein:
the processor unit includes a memory and a plurality of microprocessors; after completing the first data transfer, the first data transfer device is configured to write a first completion status of the first data transfer into a storage area in the memory allocated to the microprocessor which has set the first transfer parameter; and after completing the second data transfer, the second data transfer device is configured to write a second completion status of the second data transfer into a storage area in the memory allocated to the microprocessor which has set the first transfer parameter.

14. A data transfer method using a data transfer control device, which is configured to transfer data from a transfer source device to a transfer destination device via a memory, the data transfer device comprising: a first data transfer device coupled to the transfer source device and the memory, and configured to perform a first data transfer of the data from the transfer source device to the memory according to a first transfer parameter when the first transfer parameter is set; and a second data transfer device coupled to the transfer destination device, the memory and the first data transfer device, and configured to perform a second data transfer of the data from the memory to the transfer destination device according to a second transfer parameter when the second transfer parameter is set, the method comprising:
causing the first data transfer device to receive the first transfer parameter containing the second transfer parameter;
performing the first data transfer according to the first transfer parameter; and
setting the second transfer parameter contained in the first transfer parameter to the second data transfer device.

15. The data transfer method according to claim 14, wherein the first data transfer device determines whether the first data transfer according to the first transfer parameter is completed or not, and sets the second data transfer device to have the second transfer parameter contained in the first transfer parameter when determining that the first data transfer is completed.

* * * * *